United States Patent
Marr, Jr. et al.

(10) Patent No.: US 12,470,279 B2
(45) Date of Patent: Nov. 11, 2025

(54) SYSTEM AND METHOD FOR SCALABLE ON-ARRAY PROCESSING AND INTERFERENCE MITIGATION USING ADAPTIVE BEAMFORMING

(71) Applicant: CHAOS INDUSTRIES, INC., Hermosa Beach, CA (US)

(72) Inventors: Harry Bourne Marr, Jr., Manhattan Beach, CA (US); William Griffin Dower, Hermosa Beach, CA (US); Brian Hay, Hermosa Beach, CA (US); Daniel Thompson, Hermosa Beach, CA (US)

(73) Assignee: CHAOS INDUSTRIES, INC., Hermosa Beach, CA (US)

( * ) Notice: Subject to any disclaimer, the term of this patent is extended or adjusted under 35 U.S.C. 154(b) by 75 days.

(21) Appl. No.: 18/437,156

(22) Filed: Feb. 8, 2024

(65) Prior Publication Data

US 2025/0260469 A1 Aug. 14, 2025

(51) Int. Cl.
*H04B 7/06* (2006.01)
*H04W 16/28* (2009.01)

(52) U.S. Cl.
CPC ........ *H04B 7/06956* (2023.05); *H04W 16/28* (2013.01)

(58) Field of Classification Search
CPC ........................... H04B 7/06956; H04W 16/28
See application file for complete search history.

(56) References Cited

U.S. PATENT DOCUMENTS 6,456,244 B1 * 9/2002 Goldstein .......... H01Q 21/0087
343/700 MS
7,016,381 B2 3/2006 Husain et al.
(Continued)

FOREIGN PATENT DOCUMENTS

EP 2705726 A1 3/2014
EP 2803217 A2 11/2014
(Continued)

OTHER PUBLICATIONS

Patent Cooperation Treaty, International Search Report and Written Opinion issued in PCT/US2025/015016, Apr. 25, 2025, pp. 1-14.

*Primary Examiner* — Jaison Joseph
(74) *Attorney, Agent, or Firm* — Pillsbury Winthrop Shaw Pittman LLP

(57) ABSTRACT

Methods and systems are described herein for adaptive beamforming and interference mitigation using a time synchronized scalable cohered on-array processing system ("system"). The system may be a phased array implementing a software-defined radio using multi-input-multi-output antenna elements. The system includes multiple subarray elements which are configured into a tiered array of scalable subarrays that performs intermediary collation, coherence, noise reduction, and adaptive beamforming operations through processor nodes disposed between tiers. The intermediary collation operations process discrete portions of node excitation data to enable the phased array to generate an adaptive beam profile that directs high-directionality beams toward desired targets while adaptively partitioning interference sources between subarray elements. Further, the system makes use of a scalable multidimensional array to provide telecommunication and electromagnetic wave manipulation operations for applications of varying scale.

30 Claims, 11 Drawing Sheets

400

Calibrate, via an arbitrary processor node, a plurality of aggregated weight vectors for a plurality of subarray elements within a phased array, wherein the arbitrary processor node is from a plurality of processor nodes
402

Determine, via a corresponding processor node, if a covariance matrix is full rank in relation to each of the plurality of aggregated weight vectors, wherein each of the plurality of subarray elements is associated with the corresponding processor node from the plurality of processor nodes
404

Generate, via the corresponding processor node, an interference mitigation protocol for each of the plurality of subarray elements based on at least one of the aggregated weight vector and the covariance matrix
406

Output, via the plurality of subarray elements, an adaptive beam pattern in accordance with the interference mitigation protocol, wherein the adaptive beam pattern includes a at least one high-directionality beam generated by at least one first subarray element and at least one mitigation signal modulated by at least one second subarray element
408

(56) References Cited

U.S. PATENT DOCUMENTS

| | | | |
|---|---|---|---|
| 7,356,064 B2 | 4/2008 | Husain et al. | |
| 8,411,765 B2 | 4/2013 | Smith et al. | |
| 8,498,658 B2 | 7/2013 | Smith et al. | |
| 8,743,976 B2 | 6/2014 | Smith et al. | |
| 8,867,921 B2 | 10/2014 | Smith et al. | |
| 8,989,247 B2 | 3/2015 | Smith et al. | |
| 9,002,138 B2 | 4/2015 | Ranalli et al. | |
| 9,071,742 B2 | 6/2015 | Birkbeck et al. | |
| 9,201,132 B2 | 12/2015 | Hsu et al. | |
| 9,253,360 B2 | 2/2016 | Birkbeck et al. | |
| 9,419,703 B2 | 8/2016 | Smith et al. | |
| 9,453,905 B2 | 9/2016 | Smith | |
| 9,497,722 B2 | 11/2016 | Husain et al. | |
| 9,548,799 B2 | 1/2017 | Hsu et al. | |
| 9,793,969 B2 | 10/2017 | Smith et al. | |
| 9,794,903 B2 | 10/2017 | Smith et al. | |
| 9,806,846 B2 | 10/2017 | Smith et al. | |
| 9,921,396 B2 | 3/2018 | Ranalli et al. | |
| 9,980,244 B2 | 5/2018 | Smith et al. | |
| 10,021,659 B2 | 7/2018 | Rode et al. | |
| 10,177,822 B2 | 1/2019 | Smith et al. | |
| 10,756,443 B1 | 8/2020 | Struhsaker et al. | |
| 11,025,394 B1* | 6/2021 | Bakr | H04B 7/0417 |
| 11,158,942 B1* | 10/2021 | Scott | H04B 7/0617 |
| 2007/0096982 A1* | 5/2007 | Kalian | H01Q 25/02 |
| | | | 342/377 |
| 2009/0046768 A1* | 2/2009 | Pare, Jr. | H04B 7/0413 |
| | | | 375/220 |
| 2010/0056059 A1* | 3/2010 | Lakshmanan | H04B 7/0452 |
| | | | 455/39 |
| 2014/0210666 A1 | 7/2014 | Maltsev et al. | |
| 2015/0109489 A1 | 4/2015 | Saperstein et al. | |
| 2016/0047894 A1 | 2/2016 | Rode et al. | |
| 2016/0299291 A1 | 10/2016 | Smith et al. | |
| 2017/0038456 A1 | 2/2017 | Smith | |
| 2017/0086160 A1 | 3/2017 | Smith et al. | |
| 2017/0163327 A1 | 6/2017 | Yang et al. | |
| 2018/0020416 A1 | 1/2018 | Smith et al. | |
| 2018/0091205 A1 | 3/2018 | Smith et al. | |
| 2019/0028304 A1 | 1/2019 | Rode et al. | |
| 2023/0028888 A1 | 1/2023 | Wernersson et al. | |
| 2024/0259832 A1* | 8/2024 | Raghavan | H04W 8/22 |
| 2024/0340818 A1* | 10/2024 | Marr, Jr. | H04W 56/0015 |

FOREIGN PATENT DOCUMENTS

| | | |
|---|---|---|
| EP | 2852232 A2 | 3/2015 |
| EP | 2984901 A1 | 2/2016 |
| WO | 2010042319 A2 | 4/2010 |
| WO | 2013106636 A2 | 7/2013 |
| WO | 2014168892 A1 | 10/2014 |
| WO | 2016137898 A1 | 9/2016 |
| WO | 2012151316 A1 | 11/2018 |

* cited by examiner

400

Calibrate, via an arbitrary processor node, a plurality of aggregated weight vectors for a plurality of subarray elements within a phased array, wherein the arbitrary processor node is from a plurality of processor nodes
402

Determine, via a corresponding processor node, if a covariance matrix is full rank in relation to each of the plurality of aggregated weight vectors, wherein each of the plurality of subarray elements is associated with the corresponding processor node from the plurality of processor nodes
404

Generate, via the corresponding processor node, an interference mitigation protocol for each of the plurality of subarray elements based on at least one of the aggregated weight vector and the covariance matrix
406

Output, via the plurality of subarray elements, an adaptive beam pattern in accordance with the interference mitigation protocol, wherein the adaptive beam pattern includes a at least one high-directionality beam generated by at least one first subarray element and at least one mitigation signal modulated by at least one second subarray element
408

FIG. 4

SYSTEM AND METHOD FOR SCALABLE ON-ARRAY PROCESSING AND INTERFERENCE MITIGATION USING ADAPTIVE BEAMFORMING

BACKGROUND

Phased array antennas and beamforming technologies have been pivotal in advancing radar systems, satellite communications, and the burgeoning field of 5G networks. These technologies enable the steering of the antenna beam electronically, providing flexibility and precision in targeting and communications. However, despite their advantages, the currently used technologies come with significant shortcomings.

One of the primary challenges is their complexity and associated cost. The intricate design and need for precision alignment of numerous array elements make production and maintenance both challenging and expensive. This complexity limits their accessibility and application, particularly in cost-sensitive domains. Traditional phased arrays are often bulky and heavy. This is a substantial drawback for mobile platforms and space applications where weight and space are at a premium. The physical size of these systems can also limit their field of view and scanning range, affecting performance in critical applications.

Traditional phased arrays generally have high power requirements, which poses a challenge for mobile applications. Additionally, increasing array complexity leads to increased thermal management requirements which frequently call for additional power consuming cooling equipment.

Finally, the adaptability and scalability of traditional phased arrays are limited. Tailoring these systems for different applications or frequency ranges can be an arduous task, often requiring a complete redesign. While traditional phased arrays and beamforming technologies have been instrumental in advancing modern communication and radar systems, their complexity, cost, size, power consumption, and limited adaptability pose significant challenges. There is therefore a need to address the above-cited issues.

SUMMARY

In general, the method(s) described herein may facilitate and/or otherwise include calibrating, via an arbitrary processor node, a plurality of aggregated weight vectors for a plurality of subarray elements within a phased array, where the arbitrary processor node is from a plurality of processor nodes. The method(s) may include determining, via a corresponding processor node, if a covariance matrix is full rank in relation to each of the plurality of aggregated weight vectors, where each of the plurality of subarray elements is associated with the corresponding processor node from the plurality of processor nodes. The method(s) may include generating, via the corresponding processor node, an interference mitigation protocol for each of the plurality of subarray elements based on at least one of the aggregated weight vector and the covariance matrix. The method(s) may include outputting, via the plurality of subarray elements, an adaptive beam pattern in accordance with the interference mitigation protocol, where the adaptive beam pattern includes an at least one high-directionality beam generated by at least one first subarray element and at least one mitigation signal modulated by at least one second subarray element. Other embodiments include corresponding computer systems, apparatus, and computer programs recorded on one or more computer storage devices, each configured to perform one or more of the actions of the method(s).

BRIEF DESCRIPTION OF THE DRAWINGS

FIG. 4 shows a flowchart of a method for generating at least one adaptive beam directed toward the at least one target and at least one mitigation signal directed toward an interference source, consistent with various embodiments.

DETAILED DESCRIPTION

Figure 1A:
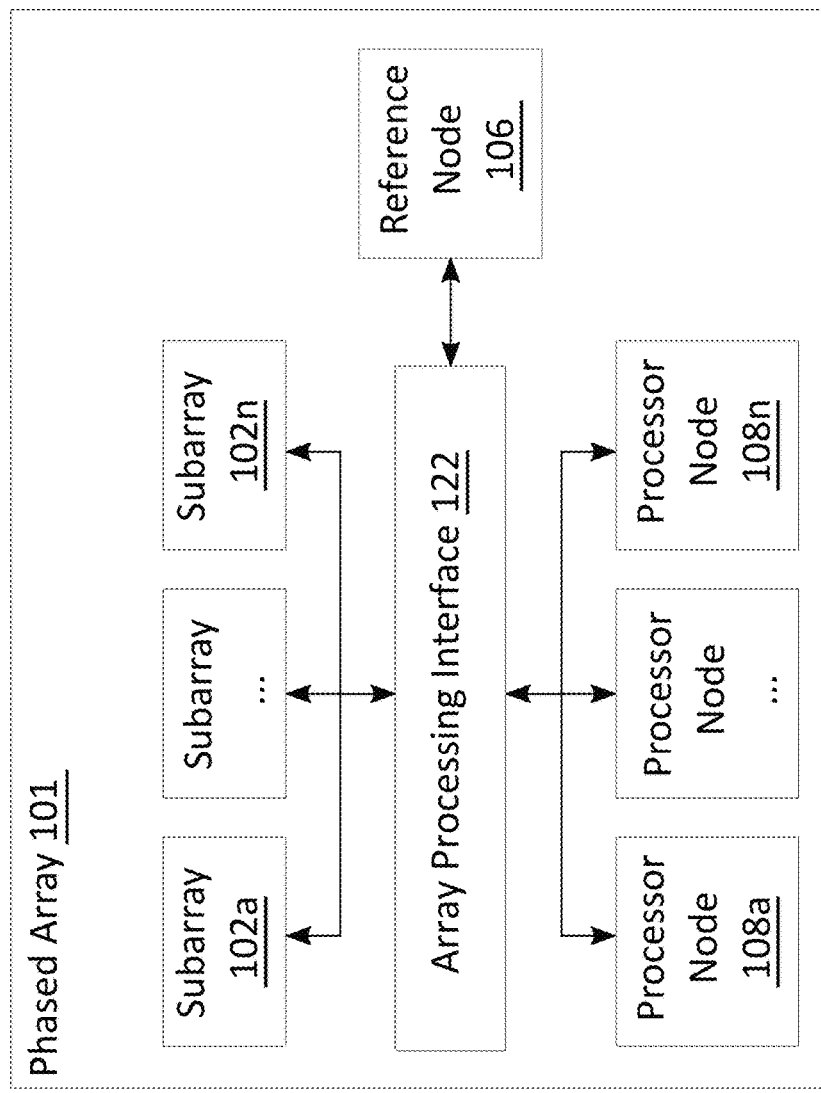
FIG. 1A shows a block diagram of a tiered phased array system, consistent with various embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

The disclosed concept relates to a system that leverages an adaptive phased array transceiver that may implement a plurality of transmit and receiver operations (e.g., analog RC chain communication, or a software-defined radio (SDR) system) and comprises a number of time aligned antenna nodes within a phased array to provide a flexible multi-function radio frequency (RF) solution. For example, the system may use modular (or tile) and scalable units that contain multiple antenna elements and digital processors. This reduces the number of printed circuit boards and connectors in the array, which lowers the cost and complexity of the system. Further, this modular processing architecture reduces the overall power requirements and thermal management constraints for operation. The system may provide communications, radar, and electronic intelligence (ELINT) capabilities in a rapidly deployable software-defined architecture. In some embodiments, the system leverages machine learning algorithms to enable a phased array of SDR antenna elements to mitigate, respond to, and potentially implement RF interference and jamming techniques (e.g., frequency hopping jamming, spread spectrum jamming, powerful pulse jamming, smart or adaptive jamming, low probability of intercept (LPI) techniques). For example, the system may implement or respond to jamming operations where the jamming devices rapidly switch frequencies, making it difficult for traditional static-frequency countermeasures to adapt. The system may implement or respond to jamming operations where jammers spread their energy across a wide range of frequencies, effectively diluting the power of the jamming signal but impacting a broader set of frequencies. The system may employ or respond to synchronized short bursts of high-power signals capable of overwhelming receivers (e.g., systems relying on sensitive detection equipment). The system may employ or respond to jamming operations that analyze the target's signal and adapt the jamming strategy accordingly. The system may employ or respond to jamming operations that mimic legitimate signals to create confusion or use selective jamming techniques to target specific communications while leaving others unscathed. The system may employ or respond to jamming operations that use signals with low power levels to remain undetected while still effectively disrupting communications. The system is designed to adapt with continuous advancement in both jamming techniques and beamforming countermeasures used in electronic warfare. The system's ability to rapidly adapt to the changing electronic warfare landscape is designed to both leverage and counteract the integration of advanced technologies such as artificial intelligence (AI) and machine learning. The system may leverage adaptive beamforming techniques to point high-gain directional beams toward satellites of interest while simultaneously creating null beams to cancel 5G and/or multispectral interference. These beams can be arbitrarily steered in real time to track the satellite's transition across the sky based on orbital parameters known a priori and/or gathered in real time. Further, being able to synchronize multiple antenna nodes provides a technical discriminator enabling the system to implement a scalable processing architecture where the computational overhead of signal processing and adaptive beamforming required to cohere groups of subarray elements within the phased array is distributed across a number of processor nodes. In some embodiments the system employs a method for deploying a phased array to generate interference-signal attenuation of any desired signal (e.g., an in-name interferer or an electronic warfare/intentional jamming signals). The system may implement sidelobe cancellation and nulling to bolster interference mitigation operations. In some embodiments, the system may operate in a range from 5 Hz to 10 THz.

Figure 2:
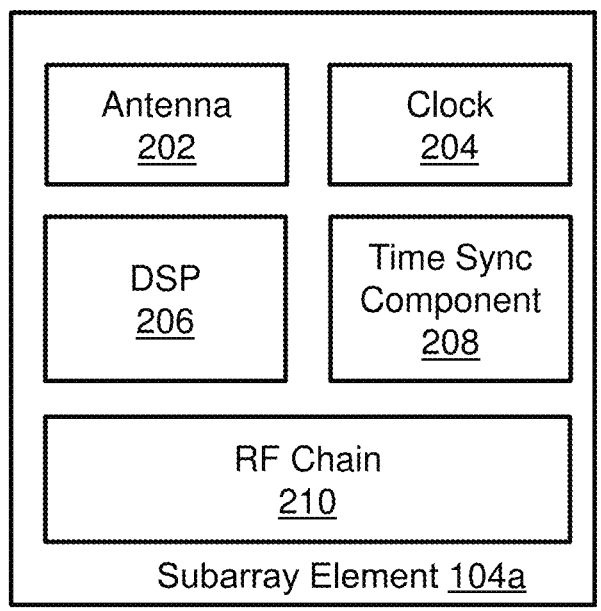
FIG. 2 is a block diagram of a subarray element of the system of FIG. 1A, consistent with various embodiments.

FIG. 1A shows a scalable cohered on-array processing (SCOAP) system 100, consistent with various embodiments. For example, the system 100 may include a phased array 101 that has been partitioned into a plurality of subarrays 102a-102n, at least one reference node 106, and a plurality of processor nodes 108a-108n, and an array processing interface 122. In some embodiments, each of the plurality of subarrays 102a-102n comprises a plurality of SDR antenna elements that are computationally and/or physically grouped. For example, the phased array 101 may include 256 SDR antenna elements arranged into a 16×16 grid. The entire collection of SDR antenna elements may then be partitioned into 16 subarrays that each contain a four-by-four array of SDR antenna elements. In some embodiments, the plurality of antenna elements is configured to operate using analog RF chain components 210 (FIG. 2). In some embodiments, the system 100 may implement all of the beamforming, steering, filtering, and analysis operations via SDR or analog RF chain configurations so that, except as stated otherwise, the terms "SDR" and "analog RF chain" can be used interchangeably herein to refer to electromagnetic transceivers. In further embodiments, the system 100 may include both SDR and analog RF chain antenna elements within the same phased array 101. For example, the system 100 may partition the plurality of subarrays 102a-102n such that a first subgroup contains SDR antenna elements, a second subgroup contains analog RF antenna elements, and/or a third group contains a mix of the various antenna element types. The system 100 may generate unique adaptive beam protocols that direct each of the subgroups to generate a desired output. Further, the system 100 may determine the appropriate antenna element type to include in the subgroups based on the desired implementation.

In some embodiments, the SDR antenna elements may be selected for inclusion in an arbitrary subarray (e.g., 102a) based on at least one of a signal's angle of arrival (AOA), the characteristics of at least one spatial interference source, a desired adaptive beam pattern, a current position and/or path of travel of a target, operational capacity (e.g. functioning properly or malfunctioning), and algorithmic analysis (e.g., machine learning and/or AI models for determining an optimized configuration of SDR antenna elements in response to interference sources and/or the output of additional subarrays (e.g., 102n in the phased array 101). In some embodiments, each of the plurality of subarrays 102a-102n can be envisioned as a sensor node that facilitates the transmission of waveforms as beams in at least one desired direction.

In some embodiments, the system 100 synchronizes each of the plurality subarrays 102a-102n with a reference node 106 of the system 100 by computing a time offset between a timestamp of an occurrence of the event at a reference node 106 of the system 100 and a timestamp of an occurrence of the event at the corresponding subarray 102n. The reference node 106 may be a single SDR antenna element in the phased array 101 that is designated as the reference node. For example, in the event the plurality subarrays 102a-102n are implemented using factory-calibrated atomic clocks, the designated reference node 106 of the system 100 (e.g., a processor node 108a-108n) sends a request to each of the plurality subarrays 102a-102n, including a reference node 106 of the system 100, for a local timestamp of the corresponding subarray 102n and obtains a response including the local timestamp (e.g., a time at which the request is received at the corresponding subarray 102n).

In some embodiments, the plurality of processor nodes 108a-108n may be virtualized processors designed to execute tasks in a cloud computing environment. In further embodiments, the plurality of processor nodes 108a-108n may refer to a plurality of physical processing cores in a processing device that may further implement a series of virtualized processor nodes. In further embodiments the plurality of processor nodes 108a-108n is implemented by a Field Programmable Gate Array (FPGA) capable of being reconfigured based on processing requirements. In some embodiments, the array processing interface 122 may refer to a communications architecture or framework through which the plurality of processor nodes 108a-108n, the plurality of subarrays 102a-102n, and the reference node 106 communicate. For example, where the plurality of processor nodes 108a-108n is a plurality of virtualized processors, the array processing interface 122 may refer to a data structuring algorithm or a transfer control protocol that facilitates scalable communication between the plurality of processor nodes 108a-108n, the reference node 106, and the plurality of subarrays 102a-102n.

In an alternative embodiment, the array processing interface 122 may enable the plurality of physical processor nodes 108a-108n to be algorithmically coupled to a corresponding subarray from the plurality of subarrays 102a-102n. For example, a central processing node in the plurality of processor nodes 108a-108n may dynamically determine if at least one arbitrary processor node 108a should be assigned to direct adaptive beamforming operations performed by at least one corresponding subarray 102a-102n based on at least one node selection criteria (e.g., processor node availability, physical proximity to the at least one corresponding subarray 102a-102n, type of processing task, user preference). The phased array 101 includes pluralities of both physical and virtualized processor nodes 108a-108n that communicate with the plurality of subarrays 102a-102n through both physical and virtualized components of the array processing interface 122.

The array processing interface 122 architecture may enable the plurality of processor nodes 108a-108n to perform intermediary collation operations to analyze, filter, equalize, cohere, and adaptively modify the excitation data for the plurality of SDR antenna elements in discrete subarray-specific packets rather than in an array-wide raw data stream, as will be described in greater detail hereinbelow. The discrete packets from each of the plurality of subarrays 102a-102n can be further aggregated in a recursive series of operations that requires less computational overhead than analyzing an unsegmented array-wide raw data stream. For example, by removing noise and cohering excitation data at the subarray level, the system 100 may generate an adaptive beam profile that attenuates a newly instantiated interference source by directing a subset of subarrays 102a-102n to perform spatial nulling without recomputing new steering vectors and/or beam weights for the remaining subarrays 102a-102n in the phased array 101.

Figure 1B:
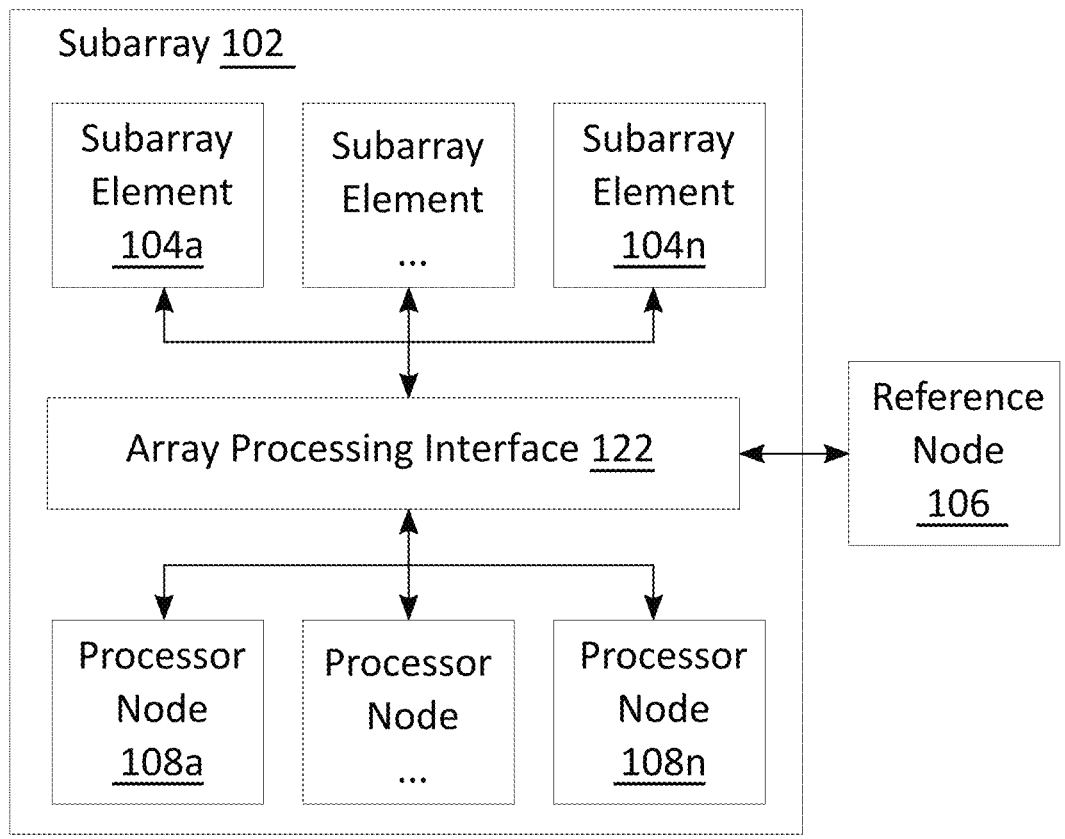
FIG. 1B shows a block diagram of a subarray element within the tiered phased array of FIG. 1A, consistent with various embodiments.

FIG. 1B is a block diagram representative of each of the plurality of subarrays 102a-102n according to an embodiment of the system 100. In some embodiments, the phased array 101 includes a plurality of subarray elements 104a-104n that function as SDR antenna elements configured to operate in a wide range of radio frequencies (e.g., 1 Hz to 300 GHz). The system 100 may be implemented for various applications. For example, the system 100 may be implemented for surveillance as a radar system, a sonar system, in oil and gas industry for finding energy resources, in mining industry for finding metals, etc. The following paragraphs describe the system 100 configured for transmission and reception of radio frequency (RF) waveforms, but the system 100 is not limited to working with RF waveforms and may be configured to work with other waveforms as well (e.g., acoustic waves, seismic waves, etc.). In some embodiments, the array processing interface 122 architecture is implemented for intra-subarray communication. Accordingly, each of the plurality of subarray elements 104a-104n may be algorithmically coupled to at least one of the plurality of processor nodes 108a-108n and the reference node 106. In some embodiments, the plurality of subarray elements 104a-104n within the subarray 102 may be divided into subgroups that are each associated with at least one of the plurality of processor nodes 108a-108n. Thus configured, each of the subgroups functions as a nested subarray of the subarray 102 that can be coupled (e.g., algorithmically, physically, communicably, or any combination thereof) to the plurality of processor nodes 108a-108n to enable granular control over each element of the phased array 101, and thereby decrease the processing overhead and power requirements of beamforming operations performed by the system 100. Further, by implementing the array processing interface 122 architecture, phased arrays 101 can be sectored into a tiered operational structure that can be seen as a tiered array of scalable subarrays 102a-102n (FIG. 3B) where excitation data derived from a lower tier of the scalable architecture is used as input for a subsequent tier of the scalable architecture. This configuration enables the phased array 101 to generate adaptive beam patterns that include multiple high-directionality beams and/or spatial nulls of tunable resolution. For example: the entire phased array 101 may be configured to generate a single high-directionality beam; each of the plurality of subarrays 102a-102n may a generate high-directionality beam and/or spatial null that is/are oriented using independent steering vectors; a first subset of the plurality of subarrays 102a-102n may a generate first high-directionality beam and/or spatial null based on a first steering vector, a first adaptive beam weight and a first covariance matrix representation of interference sources, while at least one second subset of the plurality of subarrays 102a-102n may a generate at least one second high-directionality beam and/or spatial null that is based on a second steering vector, a second adaptive beam weight and a second covariance matrix representation of interference sources. Further, a tiered array of scalable subarrays 102a-102n may partition the interference sources contained in the covariance matrix between the plurality of subarray elements 104a-104n such that each interference source within the covariance matrix is spatially nulled by at least one subarray element 104a-104n such that the covariance matrix is fully ranked and signal transmission and reception is optimized relative to steady-state interference and transient noise A subarray element 104a-104n may be configured to be one of (a) a transmit only subarray element in which case it may transmit waveforms but not receive waveforms, (b) a receive only subarray element in which case it may receive waveforms but not transmit waveforms, or (c) both transmit and receive subarray element in which case it may transmit or receive waveforms. Unless stated otherwise, a subarray element may be both a transmit and receive subarray element. Each of the subarray elements 104a-104n may be configured to transmit an outgoing waveform (e.g., referred to as a "probe signal") that may all combine together to form a beam in a particular direction. Each of the subarray elements 104a-104n may receive a response to the probe signal (e.g., referred to as a "data signal") that may be "time aligned" and cohered by the system 100 for further processing (e.g., by a third-party system) for one or more applications.

The system 100 time synchronizes the subarray elements 104a-104n to time align the transmitted probe signals or the data signals received by the subarray elements. In some embodiments, time aligning the data signals includes applying at least one of a time offset, phase, or amplitude to the data signals such that the data signals of all subarray elements 104a-104n have the same time offset, phase and amplitude. The system 100 may synchronize the subarray elements 104a-104n in several ways. In one example, each subarray element may have a corresponding local clock (e.g., a quartz oscillator) and the local clock may be synchronized with a phase lock loop, which is synchronized with an external signal such as (a) an external clock signal that is wired to each receiver, or (b) a wireless external signal such as a GPS signal, an astrological signal (e.g., a quasar signal, the cosmic microwave background signals or other signals from radio astronomy), waveforms from television towers, acoustic waveform, or a calibration signal from a transmitter node 302 (FIG. 3) in the system 100. In another example, each subarray element's local clock may be made up of an atomic clock with a low drift (e.g., that may not drift more than a microsecond over the period of days or even months), where the atomic clock for each subarray element may be synchronized and aligned at the factory before the subarray elements are deployed.

In some embodiments, each of the subarray elements 104a-104n shares status information with the system 100 (e.g., one or more other subarray elements 104a-104n) such that any received signals or signals transmitted by the subarray elements 104a-104n are calibrated and synchronized with each other to synchronize data collection across the system 100. The status information may include tier; subarray; relative position on the phased array 101, location of interference sources and targets, terrain data, temperature in an environment of the subarray element; location (such as determined by GPS) of the subarray element; calibration metrics such as phase and amplitude offsets of the RF components (or optical components in the case of optics); or a timestamp of an occurrence of an event such as (a) a receipt of a signal (e.g., calibration signal, GPS signal, or any other known waveform) or (b) a receipt of a request for local timestamp of the subarray element. subarray element. The system 100 synchronizes a first subarray element 104a with the reference node 106 by computing a time offset between a reference timestamp of the reference node 106 and a first timestamp of the first sensor node 104a.

In another example where the system 100 is configured to synchronize the subarray elements 104a-104n using a calibration signal, the system 100 synchronizes each of the subarray elements 104a-104n with a reference node 106 of the system 100 by computing a time offset between a timestamp of a receipt of a calibration signal at a reference node 106 of the system 100 and a timestamp of receipt of the calibration signal at the corresponding subarray element. For example, the system 100 synchronizes a first subarray element 104a with the reference node 106 by computing a time offset between a timestamp of a receipt of a calibration signal at the reference node 106 and a first timestamp of receipt of the calibration signal at the first subarray element 104a.

When a probe signal is transmitted or a data signal is received by the subarray elements 104a-104n, the system 100 (e.g., a processor node 108a-108n) may apply the corresponding time offsets to the probe signals or the data signals of the subarray elements 104a-104n to generate time aligned data signals for each of the subarray elements 104a-104n.

After the data signals are time aligned, the system 100 coheres the time aligned data signals to generate a combined data signal with a coherent gain such that power level of the combined signal may be a function of the individual time aligned signals being combined. For example, the power level of the cohered signal for a subarray a is a sum of the power levels of the individual time aligned signals of the different subarray elements 104a-104n contained therein. In another example, the power level of the cohered signal is greater than the power levels of any of the individual time aligned signals of the different subarray elements. In some embodiments, the data signals are cohered by adding the time domain signals together from the different subarray elements 104a-104n such that the data signals are time aligned and coherently added together. The cohered signal may then be intelligently signal processed by the system 100, or provided to a third-party system, for one or more applications. One such application may include a surveillance application, such as a radar system to determine one or more parameters of an object (e.g., speed and distance of an aircraft) in an environment of the system 100. Another application may include detection of radar pulses. Another application may include digital receive beamforming.

In some embodiments, one of the subarray elements 104a-104n is designated as a reference node 106, whose clock acts as a reference clock for synchronizing the clocks of the other subarray elements 104a-104n. In some embodiments, a central processing node 108a-108n is one of the subarray elements 104a-104n that is configured to perform various types of processing, such as computing time offsets, partitioning the phased array 101 into a tiered structure of scalable subarrays 102a-102n, algorithmically selecting couplings between processor nodes 108a-108n and subarray elements 104a-104n, calibrating matrices of subarray weight vectors with respect to each other, generating time aligned data signals, cohering time aligned data signals, etc. In some embodiments, the central processing node 108a-108n and the reference node 106 are the same subarray element. In further embodiments, each individual subarray element is able to perform the requisite processing and coordination operations of the central processing node 108a-108n. Accordingly, each subarray element 104a-104n may operate independently without losing the capability to perform adaptive beamforming and interference mitigation operations. Further, while descriptions included herein reference the operations (e.g., time synchronization) being performed by a single subarray element, such as the central processing node 108a-108n, the operations may be performed by another subarray element, such as the reference node 106, or by more than one subarray element. For example, any number of subarray elements may perform the time synchronization or time alignment of data signals in the case where processing is done in a distributed way. Furthermore, time synchronization operations can be performed on a scheduled basis, prior to transmitting a probe signal, or prior to receiving the data signal.

The subarray elements 104a-104n, including the reference node 106 and the central processing node 108a-108n, may be co-located (e.g., located within a specified number of wavelengths of the operating frequency) or may be remotely located (e.g., located beyond the specified number of wavelengths of the operating frequency). For example, the first subarray element 104a and the second subarray element 104n may be co-located, while the reference node 106 may be remotely located. In another example, the first subarray element 104a and the second subarray element 104n may be co-located, while a third subarray element may be remotely located. Regardless of how the subarray elements 104a-104n are located, the subarray elements 104a-104n may be synchronized as long as the location information of the subarray elements 104a-104n within a tier of the array processing interface 122 architecture, the reference node 106, or the central processing node 108a-108n is available. For example, as mentioned above, the subarray elements 104a-104n may have the capability to self-organize (e.g., share location information such as tier, subarray, and relative position on the phased array 101, via the status information) or self-calibrate (e.g., synchronize themselves to the reference node 106). The system 100 may have location information of the reference node 106 and subarray elements 104a-104n that may be used in determining a time difference in arrival of the calibration signal at the subarray elements 104a-104n with respect to the reference node 106, which may be further used in determining the time offset between the subarray elements 104a-104n and the reference node 106. The subarray elements 104a-104n may self-calibrate using the factory-calibrated atomic clocks, the calibration signal 304 (FIG. 3A), or other known waveforms on a scheduled basis, prior to transmitting a probe signal, or prior to receiving a response to the probe signal.

The subarrays 102a-102n of the system 100 may be easily scaled up or scaled down by adding or removing subarray elements 104a-104n, respectively. Furthermore, since each subarray element 104a-104n may communicate with the reference node 106 or the central processing node 108a-108n directly, all the subarray elements 104a-104n are a single hop away from the reference node 106 or the central processing node 108a-108n, and any scaling of the system 100 may not result in degradation of the time synchronization accuracy. In some embodiments, by having the subarray elements 104a-104n dynamically organized into tiered groups of subarrays coupled to corresponding processor nodes the system 100 is able to produce multiple simultaneous high-directionality beams at full gain and resolution, direct spatial nulls toward interference sources 110.

While FIG. 1A shows a single cluster of subarray elements 104a-104n, the system 100 may have several clusters in which each cluster may have several subarray elements. Different clusters may have different number of subarray elements or the same number of subarray elements. In some embodiments, such a configuration enables detection of a moving object at ultra-long range and hypersonic speeds; better angle resolution than available with a single cluster. Also, some clusters may remain completely passive making the location of the cluster difficult to impossible to ascertain without active transmissions. Yet another advantage of having multiple clusters may be that one cluster could be significantly closer in distance to the received signal and suffer much less free space path loss of the signal and thus, get a much stronger signal to share between nodes. In some embodiments, the clusters may be spread over a few hundred meters or distributed throughout a massive geographic region. Each cluster may generate a cohered signal from the time aligned signals of its constituent subarray elements and the cohered signal from all the clusters may be further cohered to generate a master cohered signal with a coherent gain such that the power level of the master cohered signal is a function of the power levels of the constituent cohered signals of the different clusters. For example, the power level of the master cohered signal is a sum of the power levels of the constituent cohered signals of the different clusters. In another example, the power level of the master cohered signal is greater than the power levels of any of the constituent cohered signals of the different clusters.

FIG. 2 is a block diagram of a subarray element of a system of FIG. 1A, and FIG. 1B, consistent with various embodiments. A subarray element (e.g., first subarray element 104a) includes an antenna 202 that facilitates radiation or reception of waveforms when connected to a transmitter or receiver (not illustrated). The antenna 202 may be configured to transmit or receive waveforms of a wide range of frequencies. The first subarray element 104a may include a clock 204 that generates a clock signal for use in synchronizing the operations (e.g., coordinate sequence of actions) of the first subarray element 104a. The clock 204 may be a quartz clock, an atomic clock, or another type of clock.

The first subarray element 104a may include a time synchronization component 208 that synchronizes the clock 204 of the first subarray element 104a in any of a number of ways mentioned above. For example, the time synchronization component 208 synchronizes the clock 204 with an external signal such as an external clock signal that is wired to the first subarray element 104a or a wireless external signal such as a GPS signal or an astrological signal. In another example, the time synchronization component 208 synchronizes the clock 204 to a clock of the reference node 106 using a calibration signal from a transmitter node (additional details of which are described at least with reference to FIGS. 3-7 below).

The first subarray element 104a includes a digital signal processor (DSP) 206 that is configured to perform various signal processing operations including generating time aligned signals, match filtering received calibration signals or data signals, setting a frequency range of the first subarray element 104a, radar signal processing, etc.

The first subarray element 104a includes an RF chain 210. In some embodiments, the RF chain 210 may be a cascade of electronic components and sub-units which may include any of amplifiers, filters, mixers, attenuators, and detectors. All these components may be combined to serve a specific application (e.g., a radar system for detection of moving objects). One or more of the components (e.g., the DSP 206 and time synchronization component 208) may be implemented using an SDR. The SDR facilitates various functionalities. For example, the SDR may facilitate obtaining of location information of the subarray elements 104a-104n, the reference node 106, or the central processing node 108a-108n relative to each other on the phased array. In another example, the SDR may facilitate in the generation of time aligned data signals.

Note that one or more components of the first subarray element 104a may be communicatively coupled to another device of the system 100 via a communication module to coordinate its operations. Some or all of the components of the first subarray element 104a may be combined as one component. A single component may also be divided into sub-components, each sub-component performing a separate method step or method steps of the single component. Any one or more of the components described herein may be implemented using hardware (e.g., a processor of a machine) or a combination of hardware and software. For example, any component described herein may configure a processor 206 to perform the operations described herein for that component. Note that as used herein, processor, plurality of processor nodes 108a-108n, and central processing node are used interchangeably to indicate the same processing portions of system 100.

Figure 3A:
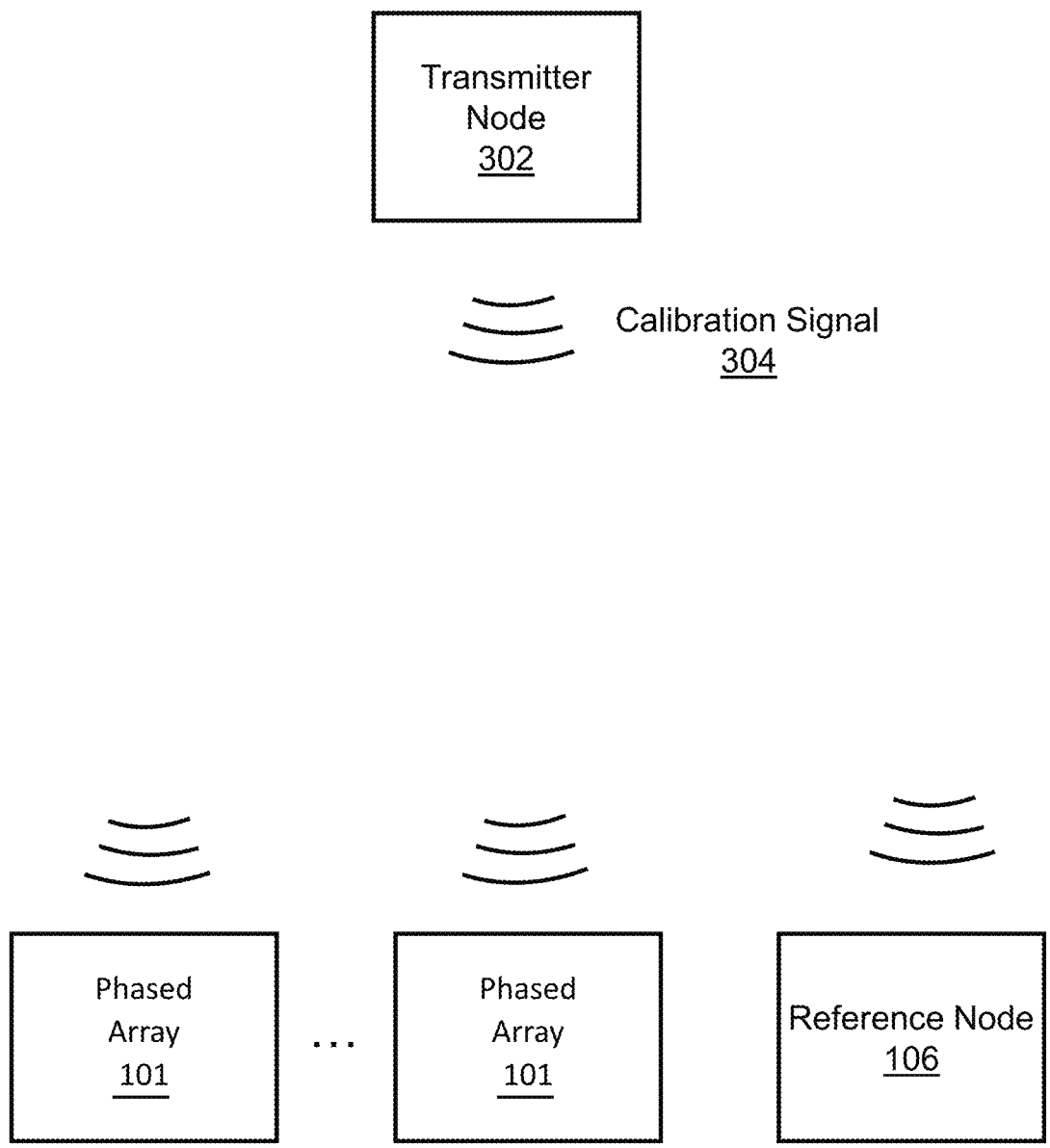
FIG. 3A shows an example of synchronizing the phased arrays using a calibration signal from a subarray element of the system of FIG. 1A, consistent with various embodiments.

FIG. 3A shows an example of synchronizing a plurality of phased arrays 101 using a calibration signal 304 from a transmitter node 302 of the system 100. The calibration signal 304 may be any of a wide range of frequencies (e.g., 50 MHz, 144 MHz, 30 GHz, etc.). Because the time synchronization is not limited to being performed using a calibration signal, it can be performed in a number of ways as mentioned above at least with reference to FIG. 1A and FIG. 1B. For example, the plurality of phased arrays 101 may be time synchronized using an external wireless signal such as a calibration signal 304 that is of a known waveform, such as a GPS signal, an astrological signal, seismic signal, acoustic signal, a signal transmitted from a transmitter (e.g., signal from television towers), or a signal transmitted from a transmitter node of the system 100. In another example, time synchronization may be achieved by using factory-calibrated atomic clocks in the subarray elements 104a-104n.

FIG. 3A is a block diagram of time synchronization of the plurality of phased arrays 101 in an embodiment where multiple systems of FIG. 1A, FIG. 1B are configured into a distributed array, consistent with various embodiments. The transmitter node 302 may be co-located with the plurality of phased arrays 101 or may be remotely located. In some embodiments, the transmitter node 302 is considered to be co-located with the plurality of phased arrays 101 if the transmitter node 302 is within a specified proximity (e.g., a specified number of wavelengths of the calibration signal 304) of the plurality of phased arrays 101. For example, if the transmitter node 302 frequency of transmission is 144 MHz, then the transmitter node 302 is considered to co-located with the plurality of phased arrays 101 if it is within "20"-"50" meters of any of the plurality of phased arrays 101. If the transmitter node 302 is beyond the specified proximity (e.g., beyond 50 m for 144 MHz frequency) of the plurality of phased arrays 101, then the transmitter node 302 is considered to be remotely located. In some embodiments, the transmitter node 302 can even be located beyond the horizon in the case where the transmitter is quite powerful (e.g., hundreds or thousands of watts per transmit power amp with multiple transmit antennas that create a transmit phased array, and where the transmit frequency is at 50 MHz). Further yet, the transmitter node 302 may also be configured to be mobile, in motion or moving. In some embodiments, by having the transmitter node 302 being remotely located with respect to the plurality of phased arrays 101, and being in motion, a "no probability of detection" sensor system may be established (e.g., because the transmitter node 302 is not co-located with the receiver phased arrays 101, an adversary may not geo-locate the receiver sensor nodes by using the transmitter signal).

Regardless of whether the transmitter node 302 is co-located or remotely located, the transmitter node 302 is located in a known location relative to the sensor nodes 104a-104n, and the calibration signal 304 may be "seen" (e.g., calibration signal 304 is above the noise) or received by the plurality of phased arrays 101 without the need for signal processing. For example, the system 100 may know the location information (e.g., tier, subarray, relative position on the phased array 101, latitude, longitude information) of the transmitter node 302. Such a configuration provides the flexibility of having the transmitter node 302 at any of various locations.

Each of the plurality of phased arrays 101, including the reference node 106, receives the calibration signal 304 and determines a timestamp of the receipt of the calibration signal 304. The system 100 computes the time offsets of the plurality of phased arrays 101 based on the timestamps of the plurality of phased arrays 101 and the timestamp of the reference node 106 to synchronize the plurality of phased arrays 101 with respect to the reference node 106.

Figure 3B:
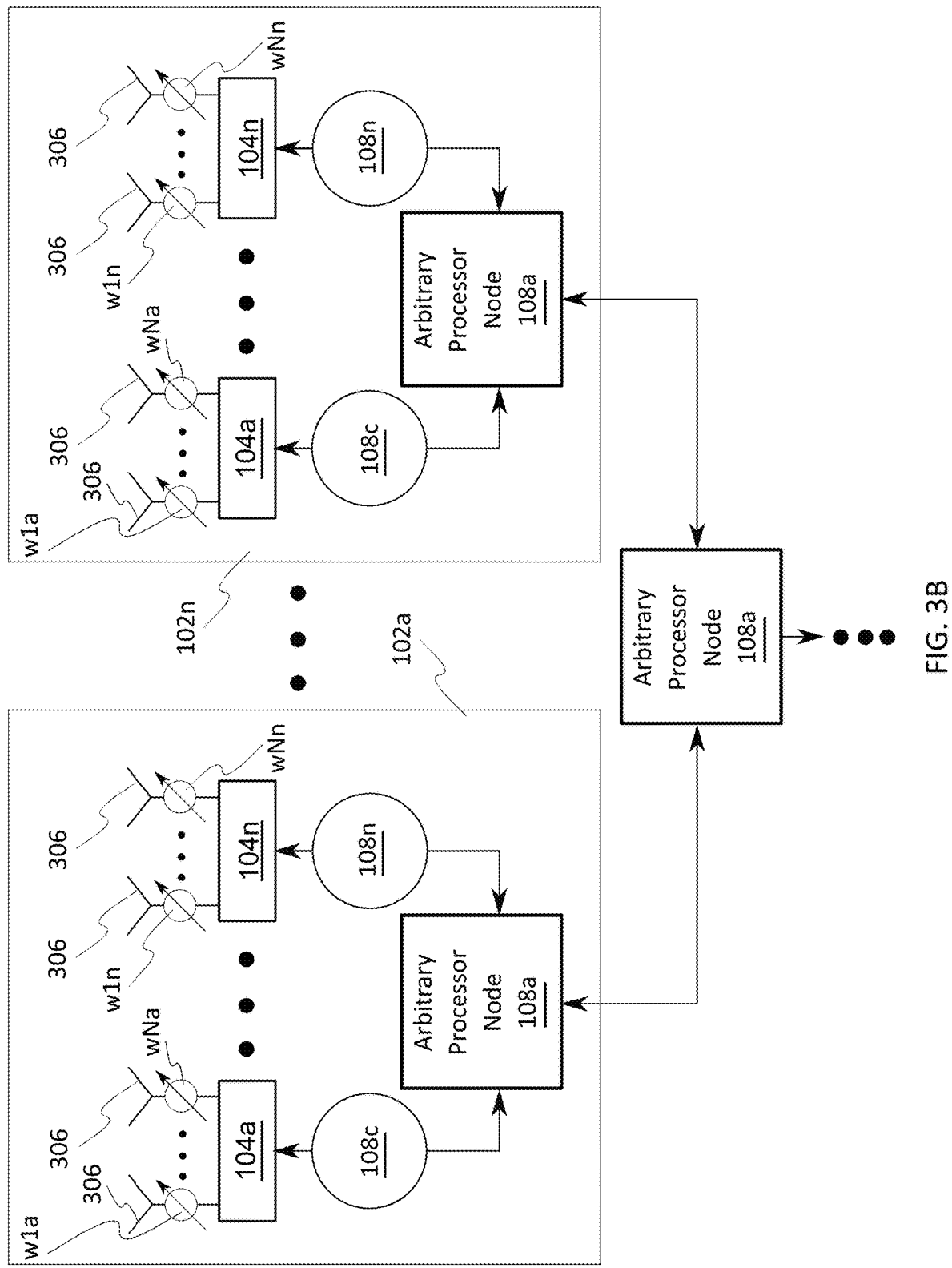
FIG. 3B shows a block diagram of the system of FIG. 1A configured to function as a scalable multidimensional array of subarray elements and antenna elements, consistent with various embodiments.

FIG. 3B is a block diagram of an embodiment of the system 100 (FIG. 1A) where the phased array 101 is configured as a tiered array of scalable subarrays 102a-102n that utilizes the array processing interface 122 to enable a processing architecture where each of the plurality of sub-array elements 104a-104n in an arbitrary tier may be seen as a signal processing node that governs the transmit and receive operations for a plurality antenna elements 306 (e.g., antenna 202, subarray element 104a-104n, subarray 102a-102n) in a preceding tier. In some embodiments, a corresponding processor node 108c for each of the plurality of subarray elements 104a-104n executes an intermediary collation operation to process and cohere data signals and node excitation data (e.g., w1a-wNa, w1n-wNn) for each of the plurality of antenna elements 306 within the preceding tier. In some embodiments, the intermediary collation operation is used to form an aggregated weight vector that is passed to an arbitrary processor node 108a as a representative weight vector for a subsequent tier of the tiered array of scalable subarrays 102a-102n. Further, an intermediary collation operation can be repeated using all representative weight vectors in the subsequent tier such that the relevant information from the plurality of representative weight vectors for each tier of the phased array 101 are contained in the final aggregated weight vector.

The node excitation data may include a matrix comprising a weight vector representation (e.g., w1a-wNa, w1n-wNn) for each of the plurality of antenna elements 306. Thus, the scalable architecture can be used to subdivide phased arrays 101 in an application-specific manner. For example, the subdivision into the plurality of granularly controlled sub-arrays 102a-102n may enable the plurality of subarray elements 104a-104n to be divided into unequal groupings such that a first subarray that is directed toward monitoring a wide area may include more elements than a second subarray that may be directed toward scanning a specific frequency range. In further embodiments, the plurality of subarrays 102a-102n may be directed toward disparate tasks (e.g., a first subarray directed toward data transmission, a second subarray directed toward spatial nulling, a third subarray directed toward RADAR operations).

In some embodiments, each subarray element 104a-104n may be a modular accumulator that combines the output from the plurality of antenna elements 306 into the representative weight vector. The arbitrary processor node 108a may cohere the data signals and node excitation data for each of the subarray elements 104a-104n in the arbitrary tier. This arbitrary tier can thus be designated the preceding tier. The tier being cohered by the arbitrary processor 108a is a newly arbitrary tier (formerly the subsequent tier). FIG. 3B illustrates this newly designated arbitrary tier as the plurality of subarrays 102a-102n each of which generates an aggregated weight vector for the newly preceding tier (formerly the arbitrary tier) which contains the representative weight vectors from the plurality of array elements 104a-104n. In some embodiments, the arbitrary processor node 108a for the subsequent tier may be referred to as a central processing node.

Prior to or simultaneous with the cohering, the arbitrary processor node 108a for the subsequent tier may combine the node excitation data (e.g., w1a-wNa, w1n-wNn) for the subarray elements 104a-104n into the aggregated weight vector representation W. The arbitrary processor node 108a governing the intermediary collation process for the subsequent tier may execute a calibration operation that begins by distributing at least one steering vector routine to each of the plurality of subarrays 102a-102n, wherein status information is generated during the at least one steering vector routine. The steering vector routine causes the subarray elements 104a-104n to generate high directionality beams 116 (see FIG. 4 and FIG. 5) and captures status information about interference sources 110 (see FIG. 4 and FIG. 5) in an area of interest 103 to generate an interference profile that contains a covariance matrix representation of the plurality of interference sources 110. The status information may further include information about how the beams generated by the plurality of antenna element 306 in the preceding tier interact with each other. The arbitrary processor node 108a may then generate a plurality of subarray-dependent adaptive processes such that a corresponding adaptive process from the plurality of subarray-dependent adaptive processes is associated with each of the plurality of subarray elements. In some embodiments of the subarray-dependent adaptive process, each representative weight vector (e.g., w1a-wNa, w1n-wNn) is deterministically or adaptively processed with respect to the other representative weight vectors to determine how close each beam pattern is to each other and to a desired beam pattern. Further, the representative weight vectors (e.g., w1a-wNa, w1n-wNn) are evaluated to determine if the subarrays 102a-102n have nulled the same interferers at the same angular locations. The subarray-dependent adaptive processes may apply a correction factor to each representative weight vector (e.g., w1a-wNa, w1n-wNn) to further tune the response. In this way each subsequent tier of the tiered array of scalable subarrays 102a-102n is able to use current status information to modify the calibration operations and subarray-dependent adaptive processes that is sent to the preceding tier of the tiered array of scalable subarrays 102a-102n.

Figure 5A:
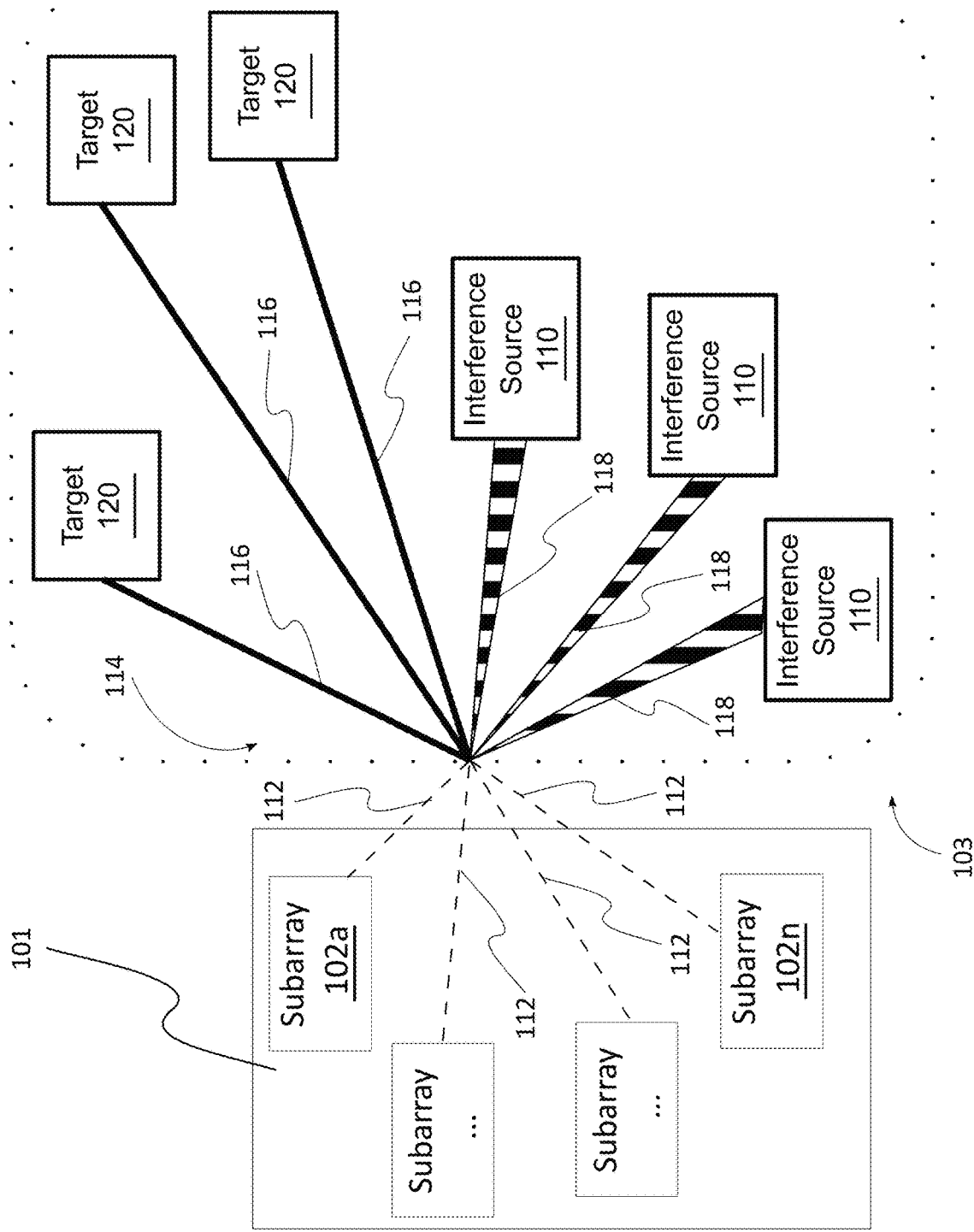
FIG. 5A is a first block diagram illustrating the system generating an adaptive beam pattern to direct spatial nulls toward interference sources and track targets with high-directionality beams, consistent with various embodiments.

Because the subarray elements 104a-104n may function as an SDR, the aggregated weight vector W may be tuned to produce a desired beam output from each of the subarray elements 104a-104n. In some embodiments, the central processing node 108a dynamically tunes the weight vector W to produce an adaptive beam pattern 114 (see FIG. 4 and FIG. 5 described below) that includes a plurality of high directionality beams 116 (FIG. 5A) and null beams 118 (FIG. 5A) oriented at a plurality of targets 120 (FIG. 5A, 5B) and interference sources 110 (FIG. 5A). In some embodiments, the at least one adaptive beam pattern 114 may include a plurality of read beams (e.g., high directionality beams 116, probe signal 808 (see FIG. 8 described below), and/or data signal 810 (see FIG. 8 described below) disposed in a desired spatial configuration within an area of interest 103 (FIG. 5A), where each read beam 116 is associated with a corresponding weight vector. Further, weight vector W may be tuned to steer any arbitrary beam within the adaptive beam pattern 114 as desired. In some embodiments, the system is a phased array configured as the tiered array of scalable subarrays 102a-102n where a direction vector of the plurality of subarray elements 104a-104n is cohered, via the central processing node 108a, by multiplying a direction vector for each element 104a-104n of the phased array 101 (e.g., system 100) with a reference signal, wherein the reference signal may include the time aligned data signal.

When the subarray elements 104a-104n and the reference node 106 (FIG. 3A) receive a data signal (e.g., a response to a probe signal transmitted by the subarray elements that is reflected off an object such as an aircraft), the subarray elements 104a-104n and the reference node 106 transmit the received data signal to the central processing node (e.g. DSP 206 (FIG. 2)). For example, the first subarray element 104a and the reference node 106 transmit the received first data signal and a reference data signal, respectively, to the central processing node 206. The central processing node 206 may then retrieve the first time offset from a storage device (not shown) and apply it to the first data signal to generate a first time aligned data signal of the first subarray element 104a. Similarly, the central processing node 206 may apply the second time offset to the second data signal of the second subarray element 104n to generate a second time aligned data signal of the second sensor node 104n.

Figure 5B:
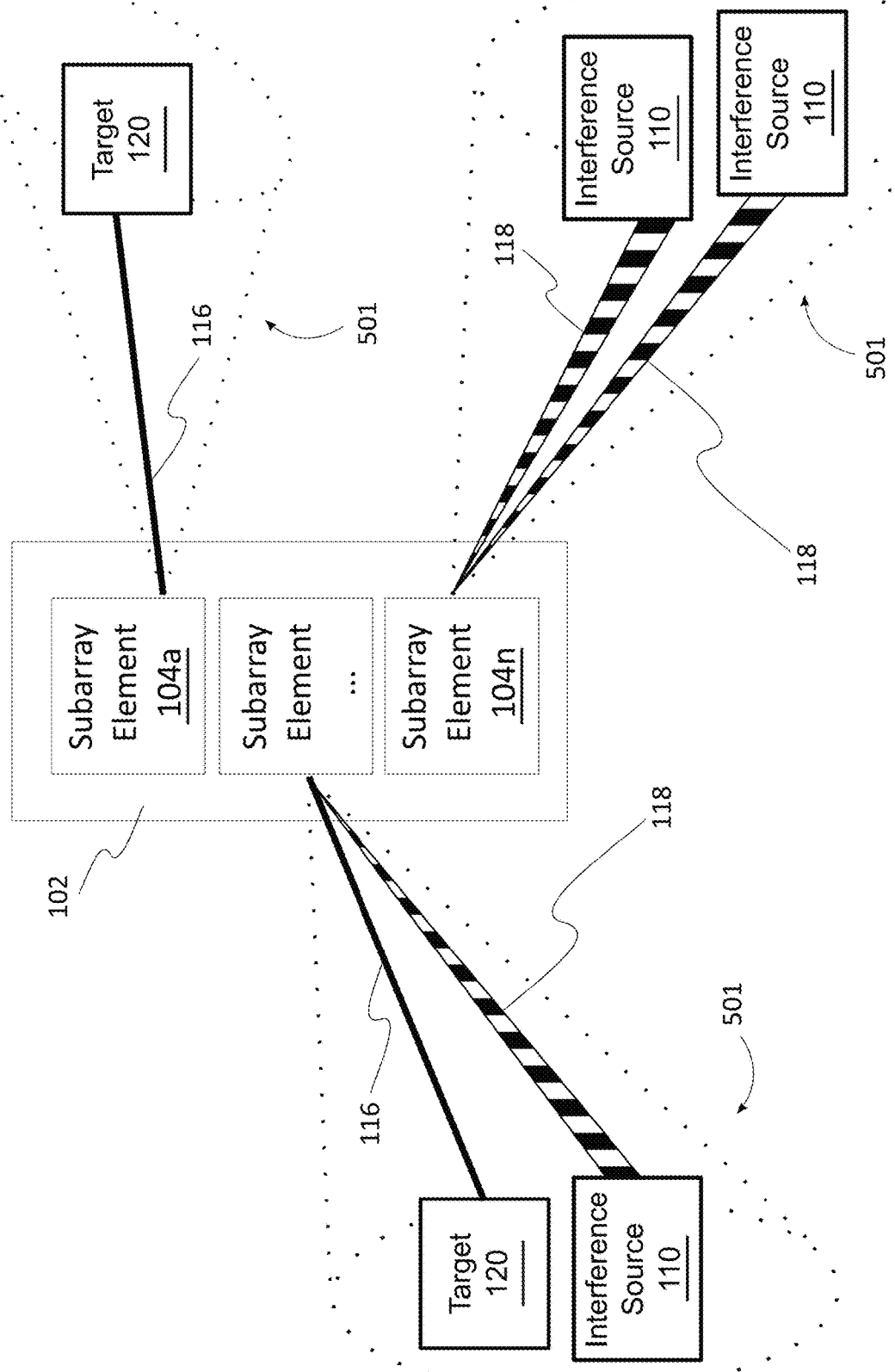
FIG. 5B is a block diagram illustrating the system partitioning interference sources between subarray elements, consistent with various embodiments.

In some embodiments, a plurality of transceiver nodes (e.g., subarrays 102a-102n, subarray elements 104a-104n, antenna elements 306) each outputs a corresponding primary beam 112 (FIG. 5A, FIG. 5B) composed of the output from the plurality of antenna elements 306, wherein each of the plurality of transceiver nodes 104a-104n is disposed to surveil at least a portion of a range and/or angle extent of the at least one target 120 (FIG. 5A, 5B). In some embodiments, the adaptive beam pattern 114 (FIG. 5A, 5B) includes a monostatic configuration used to surveil a transmit sector of the at least one target 120. Each of the plurality of transceiver nodes 104a-104n may be a multi-input-multi-output array. In further embodiments, the adaptive beam pattern 114 includes a bistatic configuration used to surveil at least one of a range and an angle extent of a transmit sector for the at least one target 120. In supplemental embodiments, the adaptive beam pattern 114 includes an isotropic configuration used to surveil an omnidirectional area of interest 103 (FIG. 5A) or field of regard 501 (FIG. 5B).

In some embodiments, the system 100 (FIG. 1A, FIG. 1B) takes a snapshot of each of the subarray elements 104a-104n at the synchronized timestamp. The snapshot may include a matrix X comprising a corresponding time aligned data signal (x1-xn) for each of the plurality of antenna elements 306. In some embodiments, the central processing node 206 directs the plurality of transceiver nodes 104a-104n to capture a plurality of snapshots of the at least one target 120 (FIG. 5A, 5B), where each of the plurality of snapshots is captured when a corresponding read beam 116 coincides with the at least one target 120. Accordingly, the central processing node 206 captures snapshots that may characterize the system's 100 response to target acquisition. Because subarray elements 104a-104n may be software-defined radios (SDR), any appropriate time aligned snapshot data may be reproduced without distortion for each of the subarray elements 104a-104n and their corresponding plurality of antenna elements 306. In some embodiments, the snapshot data may be included in the status information generated by the subarray elements 104a-104n. Additionally, the snapshot data may include information relating to interference sources 110 (FIG. 5A—e.g., 5G cell towers, jamming equipment, ambient spectrum congestion, ambient electromagnetic interference) within the area of interest 103 (FIG. 5A). Multiple snapshots (x1-xn) of the subarray elements 104a-104n may facilitate the production of multiple simultaneous read beams 116 within a field of regard 501 (FIG. 5B). In some embodiments, the process of cohering the weight vector W to the time aligned snapshot data X results in the generation of the adaptive beam pattern 114 (FIG. 5A, 5B) that adapts in relation to the time aligned snapshot data X. Accordingly the coherence operations executed by the central processing node 206 uses the corresponding weight vector for each of the plurality of snapshots to form a high-gain received signal (e.g., 116 shown in FIG. 5A, 810 shown in FIG. 8, etc.).

Example Flowchart(s)

The example flowchart(s) described herein convey example processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for employing the subarray elements 104a-104n of the system 100 (FIG. 1A, FIG. 1B) to perform intermediary collation operations for phased array signal processing using adaptive beamforming (e.g., 5G co-channel interference mitigation). In some embodiments, the subarray elements 104a-104n are a plurality of transceiver nodes 104a-104n (e.g., a plurality of isotropic antenna arrays). Method 400 may include calibrating, via an arbitrary processor node 108a, a plurality of aggregated weight vectors for a plurality of subarray elements 104a-104n within a phased array 101, where the arbitrary processor node 108a is from the plurality of processor nodes 108a-108n (block 402). The calibration operation may enable the system 100 to adaptively tune the plurality of aggregated weight vectors for the plurality of subarray elements 104a-104n in relation to each other, the covariance matrix, status information, and at least one desired steering vector. Method 400 may include determining, via a corresponding processor node 108c, if a covariance matrix is full rank in relation to each of the plurality of aggregated weight vectors, where each of the plurality of subarray elements 104a-104n is associated with the corresponding processor node 108c from the plurality of processor nodes 108a-108n (block 404). For example, the corresponding processor node 108c may determine if any of the interference sources 110 (FIG. 5B) are not being spatially nulled by at least one corresponding subarray element 104a-104n. Method 400 may include generating, via the corresponding processor node 108c, an interference mitigation protocol for each of the plurality of subarray elements 104a-104n based on at least one of the aggregated weight vectors and the covariance matrix (block 406). The interference mitigation protocol may contain the tuning values for W that enable the plurality of subarray elements 104a-104n (e.g., the plurality of antenna elements 306) (FIG. 3B) to output the desired adaptive beam pattern 114 (FIG. 5A).

Method 400 may include subprocesses for performing the intermediary collation process that may include distributing, via the at least one arbitrary processor 108a, at least one steering vector routine to each of the plurality of subarrays 102a-102n, wherein status information is generated during the at least one steering vector routine. For example, the steering vector routine may direct the plurality of subarray elements to generate an adaptive beam pattern 114 that spatially nulls at least one known interference source 110 or tracks a known target 120. By assessing known values, the system 100 is able to generate status information and determine the position of interference sources 110 in the area of interest 103 or field of regard 501. The subprocess may include receiving, via a processor (e.g., DSP 206 shown in FIG. 2) status information for the plurality of transceiver nodes 104a-104n. The transceiver nodes 104a-104n may be used to gather status information about the area of interest 103 (FIG. 5A) and to identify targets within a field of regard 501 (FIG. 5B) of the system 100. The subprocess may include determining, via the arbitrary processor node 108a (FIG. 1A, FIG. 1B), an interference profile for the area of interest 103, wherein the interference profile includes at least one interference source 110 (FIG. 5A). The interference profile may include a covariance matrix comprising all relevant characteristics (e.g., angle or direction of approach, location, frequency, directionality, signal strength) for the at least one interference source 110. Further, the interference profile may contain information gathered from external sources and may be updated based on user preference. For example, the interference profile may specify the adaptive beam pattern 114 (FIG. 5A, 5B) directs null beams and/or spatial nulls 118 (FIG. 5A) toward all but one interference source 110 within the area of interest 103.

Figure 6:
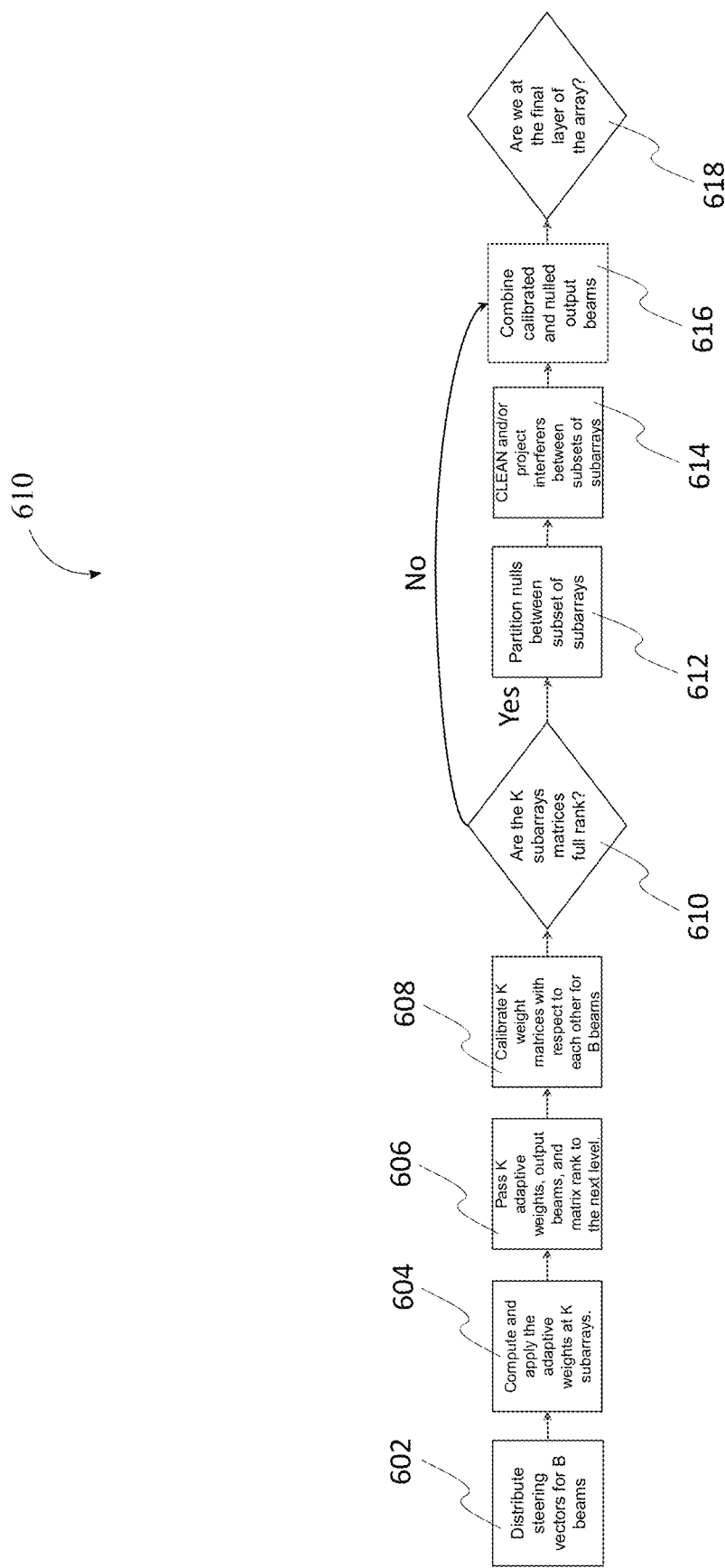
FIG. 6 shows a flowchart of a method for generating the adaptive beam pattern by cohering time aligned data signals from subarray elements of the system of FIG. 1B, consistent with various embodiments.

The subprocess may include identifying, via the arbitrary processor 108a, at least one target 120 (FIG. 5A, 5B) (block 406). For example, the system may scan the field of regard 501 (FIG. 5B) to determine the presence of the target 120 (FIG. 5A, 5B and also see FIG. 6). Additionally, the system may be directed to acquire a target at a known position. The subprocess may include executing, via the least one arbitrary processor 108a, the intermediary collation operation based on the status information and the interference profile. The intermediary collation operation generates a plurality of subarray-dependent adaptive processes, and a corresponding adaptive process from the plurality of subarray-dependent adaptive processes is associated with each of the plurality of subarray elements 104a-104n. For example, each of the plurality of subarray elements 104a-104n may be directed toward performing different tasks that, when viewed in aggregate, enable the phased array 101 (FIG. 1A) to generate high directionality beams 116 (FIG. 5A and FIG. 5B) while simultaneously performing spatial aliasing techniques (see FIG. 7A and FIG. 7B) to attenuate the plurality of interference sources 110. In some embodiments, the corresponding adaptive process for the arbitrary subarray 102a is adapted in response to an output of each of the plurality of subarray elements 104a-104n, a desired steering vector, and the covariance matrix. For example, the corresponding adaptive process for each the plurality of subarray elements 104a-104n may be updated when the interference source 110 begins transmitting or changes position. This update may direct the plurality of subarray elements 104a-104n to repartition the interference source 110 among an appropriate number of fields of regard 501 (FIG. 5B) such that the covariance matrix remains fully ranked relative to the aggregated weight vector for the arbitrary subarray 102a.

FIG. 5A illustrates an embodiment where the method 400 may include outputting, via the plurality of transceiver nodes (e.g. subarrays 102a-102n, subarray elements 104a-104n, antenna elements 306), an adaptive beam pattern 114 (e.g., high directionality beams 116 and null beams 118), wherein the adaptive beam pattern 114 includes a at least one high-directionality beam 116 generated by at least one first subarray element 104a and at least one mitigation signal modulated by at least one second subarray element 104n in accordance with the interference mitigation protocol, wherein the mitigation signal (or null beam 118) attenuates the interference source, and wherein the plurality of transceiver nodes 104a-104n forms a single phased array device (system 100) (operation 408). Accordingly, the system 100 may retain similar operational capabilities with a large number of transceiver nodes 104a-104n distributed within a large region as with a relatively small number of transceiver nodes 104a-104n distributed through the same region or located on a single phased array device. In some embodiments, generating the adaptive beam pattern 114 may employ dynamic frequency allocation adaptive beamforming techniques that can rapidly change frequencies in response to jamming, similar to frequency hopping, to evade jamming attempts. In some embodiments, generating the adaptive beam pattern 114 may employ AI and machine learning cognitive beamforming systems to predict and adapt to jamming strategies more effectively. Further, system 100 may learn from past jamming attempts and continually improve interference countermeasures. Generating the adaptive beam pattern 114 may further include adjusting the power of the transmitted signal to minimize the impact of pulse jamming and managing subarray element 104a-104n power output to maintain effective communication without wasting power resources. Generating the adaptive beam pattern 114 may further include encrypting communications and producing jamming-resistant signals (e.g., through signal modulation or redundant signal production).

FIG. 5B illustrate an embodiment where the system 100 performs a subarray-specific adaptive process to partition the plurality of interference sources within the fields of regard 501 for each of the plurality of subarray elements 104a-104n, wherein the fields of regard 501 are portions of the area of interest (FIG. 5A). Accordingly, the corresponding processor node 108c may determine if the covariance matrix is fully ranked by determining if each of the plurality of interference sources 110 is spatially nulled by at least one subarray element 104a-104n. Similarly, system 100 may be used to track the target 120 as it moves. To facilitate this functionality, the block 406 (FIG. 4) for generating the interference mitigation protocol may include a subprocess that begins by plotting, via the arbitrary processor 108a (FIG. 1A, FIG. 3B), a path of travel for the at least one target 120. For example, the at least one target 120 may be a satellite with an orbital path of travel 502 (e.g., polar orbit, walking orbit, sun synchronous orbit, Lagrange point orbit). In some embodiments, the at least one target 120 includes at least one of a fixed satellite service (FSS) and a fixed service (FS) device. Additionally, the system 100 may track terrestrial targets (e.g., vehicles, ships, aircraft, missiles, projectiles, guided munitions). The subprocess may continue by comparing, via the arbitrary processor 108a, the status information and the interference profile to determine appropriate output characteristics for the adaptive beam pattern 114 (e.g., high directionality beam 116 (FIG. 5A) and the at least one mitigation signal (or null beam 118) along the path of travel. For example, a response of a direction vector for a mainlobe 708 (see FIG. 7B described below) of the at least one primary beam 112 to a signal at an angle of approach may be adaptively modified as the angle of approach is varied over the area of interest 103 (FIG. 5A) or through the field of regard 501 (FIG. 5B). In some embodiments, the subprocess may continue by directing, via arbitrary processor 108a, the plurality of transceiver nodes 104a-104n to output the at least one adaptive beam 116 (FIG. 5B) along the path of travel and the at least one mitigation signal (or null beam 118) (FIG. 5B) as at least one spatial null coincident with a direction of the at least one interference source 110 along the path of travel. Accordingly, the system 100 prevents the at least one interference source 110 from undesirably impacting the adaptive beam pattern 114 (e.g., reducing gain, directionality, SNR) regardless of the position, angle of approach, or orientation of the at least one target 120 relative to each element of the system 100. In some embodiments, the spatial null is greater than 50 decibels (dB).

FIG. 6 shows a block diagram illustrating signal processing operations 600 for some embodiments of the system 100 (FIG. 1A, FIG. 1B) that are used to implement dynamically adaptive distribution (DyAD) processing. In some embodiments the DyAD can be envisioned as a rank one matrix that is formed by the outer product of a vector. DyAD processing entails distributing beam and null direction vectors to the subarray level of the phased array 101. Thereby, enabling computation a much more efficient DyAD-matrix based adaptive algorithm using only passed parameters and the local subarray elements. The operations 600 may begin at 602 where N array elements 104a-104n are partitioned between K subarray processors 108a-108n and steering vectors are distributed to each of the N array elements.

In some embodiments, a steering vector distribution protocol can be executed by the corresponding processor node 108c (FIG. 3B) for the arbitrary tier that is configured to perform the intermediary collation operation for the antenna elements 306 in the preceding tier and to distribute subarray-dependent adaptive processes to the plurality of antenna elements 306 (FIG. 3B) in the preceding tier. During each of the subarray-dependent adaptive processes, the steering vector for a corresponding antenna element 306 is directed to point a corresponding primary beam 112 (e.g., high-directionality beam 116, null beam 118 (FIG. 5B)) toward a position with a desired azimuth and elevation.

The steering vector distribution protocol may further include pointing the main beam of the arbitrary subarray 104a toward the boresight (e.g., zero elevation and zero azimuth) of a capsulated array that is bounded to resolve excitation data from the preceding tier and the arbitrary tier. The system 100 is thus able to calibrate the adaptive beam pattern 114 (FIG. 5A) for the arbitrary subarray element 104a by analyzing the response that the primary beams 112 (FIG. 5B) of the preceding tier induce on boresight acquisition and retention in the arbitrary subarray element 104a in the arbitrary tier. This steering vector distribution protocol may be repeated for each tier of the phased array 101, executed for a single subarray element 104n only, or executed such that there are intervening tiers disposed between the preceding and arbitrary tiers.

In some embodiments, the steering vector distribution protocol may distribute subarray-dependent adaptive processes to the antenna elements 306 (FIG. 3B) in a bottom tier of the phased array 101 and point the main beam 116 (FIG. 5B) of a subarray 102n in a top tier toward boresight. Thus, facilitating calibration of the top tier subarray 102n without necessitating the processing overhead required to resolve the excitation data from the intervening tiers.

In further embodiments, the steering vector distribution protocol monitors the response of the main beam 116 to reduce power usage and processing requirements. For example, the number of beams sent from the preceding tier, where the analog and/or digital (A/D) samples (e.g., w1a-wNa, w1n-wNn) are initially sampled by the plurality of antenna elements 306, can be decreased significantly by determining the response that providing small offset angles between the primary beam 112 of the preceding tier and the main beam 116 of the subsequent tier induce and then removing or deactivating antenna elements 306 that do not impact the desired main beam 116. For example, a main beam 116 angle will be pointed in a certain direction and a primary beam 112 (e.g., the aggregated weight vector) will be sent from the preceding tier to the subsequent tier. The subsequent tier may use the aggregated weight vector as input to generate the adaptive beam pattern 114 that is relatively similar to the aggregated weight vector produced by the preceding tier. These relatively similar beams can then be angularly tuned to achieve a desired adaptive beam pattern (e.g., a single high-directionality beam 116 or a group of high-directionality beam 116 and/or null beams 118). Because the adaptive beam pattern 114 in the subsequent tier is similar to the primary beam 112 of the preceding tier, the beams can be produced with small angular offsets applied to their adaptive steering vectors or deterministically beamformed. Thus, the system 100 further reduces processing and power requirements by reducing the number of antenna elements 306 that must be activated or resolved to achieve the desired adaptive beam pattern 114.

Operation 600 may continue at 604 where these K subarray processors 108a-108n adaptively compute each subarray element's 104a-104n representative weight vectors based on a desired steering vector for at least one of the beams generated by array elements 104a-104n. the adaptive computation may include generating a covariance matrix of interference sources 110 and tuning the representative weight vectors to perform application-specific tasks (spatially nulling interference sources, tracking targets along a path of travel). Operation 600 may continue at 604 by passing the element weights, matrix rank, and adaptively filtered output data to the subsequent level, or tier, of the array. Operation 606 may relate to an intermediary collation process where the plurality of subarray elements from the arbitrary tier are passed to the arbitrary processor node 108a of the subsequent tier for further collation and coherence. Operation 600 may continue at 608 by processing beam weights to determine calibration factors that are passed back to the subarray elements 104a-104n thereby creating a feedback loop for adaptive beamforming operations. Operation 600 may continue at 610 by determining if the subarrays adaptive matrix is full rank. That is, the system 100 determines if each of the plurality of interference sources 110 in the covariance matrix is spatially nulled by at least one subarray element 104a-104n within each of the plurality of subarrays 102a-102n. If the adaptive matrix is full rank, then operation 600 continues at 612 by partitioning the nulls between subsets of arrays such that the majority of the subarray elements 104a-104n of the phased array 101 may be directed toward transmit and receive operations while a subset of subarray elements 104a-104n can be directed toward interference mitigation. Operation 600 may continue at 614 by performing additional signal processing and filtering operations to further refine the data signal received from the preceding tier. At 614 the system 100 may employ statistical analysis of the adaptive weights to overcome imperfect knowledge/construction of array and effectively use jammers as calibration sources to produce spatial nulls. For example, system 100 may improve signal to noise ratio by performing statistical analytical techniques including maximum-likelihood estimation and nonlinear least square estimation. Operation 600 may continue at 616 by performing an additional intermediary collation process to combine the calibrated and nulled output beams. Operation 600 may continue by checking if there is a subsequent tier to pass the output of the intermediary collation operation at 616. If no subsequent tier exists, then the output is designated as the signal data for the phased array 101.

In some embodiments, system 100 employs a distributed adaptive beamforming algorithm that achieves O(NlogN) via each distributed subarray computing partial beams locally at each subarray using only a small number of key beam parameters resulting in fully summed beams at the array level. The system may employ algorithms to generate the spatial filters locally at each subarray in a distributed way and yet calibrate the spatial filters across the array in O(NlogN) to overcome critical synchronization and mismatch errors across the array. Further, system 100 may provide a way to estimate the inverted covariance matrix for the entire array 101 using only passed parameters and the local subarray elements.

An external signal (e.g., data signal 810 (FIG. 8)) received by the antenna array 101 (e.g., antenna elements 306 (FIG. 3B)) is transferred to an analog receiver to be adjusted to account for an internal equalization signal (e.g., calibration signal 304 (FIG. 3A)). The adjusted signal may then be transferred to an analog-to-digital converter before being transferred to a complex value converter where the received signal is then downconverted to baseband such that the subsequent processing can be done in a complex-valued baseband domain. The signal is then sent to an equalizer where the excitation data (e.g., w1a-wNa, w1n-wNn) (FIG. 3B)) from the plurality of antenna elements 306 in each transceiver node 104a-104n is cohered to form a time aligned signal. As the signal data may then be subjected to cohering, collation, and equalization operations to facilitate the generation of an interference profile. System may then perform the subarray-dependent adaptive processes to direct the plurality of subarrays 102a-102n toward generating the adaptive beam pattern 114 (FIG. 5A, 5B) and increasing signal quality. The interference mitigation protocol can be broadly seen as a protocol for increasing the SNR of the system 100. The interference mitigation protocol may employ pulse compression techniques to provide SNR gain, isolation of the target 120 in range, and low range sidelobes to suppress interference sources 110 at other ranges and strong close-range clutter reduction. Similarly, system 100 may further isolate the signal by employing doppler filtering techniques to provide SNR gain, isolation of the target 120 in doppler (which corresponds to range-rate), clutter nulling, and low doppler sidelobes to suppress interference sources 110 at other range-rates.

In some embodiments, the plurality of processor nodes 108a-108n (FIG. 1A, FIG. 1B, FIG. 3B) may employ a machine learning algorithm to implement a software-defined adaptive filter for separating a signal of interest from the at least one interference source 110. Further, the software-defined adaptive filter enables the system 100 to account for the high variability of interference sources 110 (FIG. 5A) and target 120 (FIG. 5A, 5B) locations when generating the adaptive beam pattern 114 (FIG. 5A, 5B). A subprocess for implementing the software-defined adaptive filter may begin by identifying a domain for interference removal prior to separating the signal of interest, wherein the domain is at least one of temporal (fast time, slow time), spatial, polarization, or combinations thereof. Accordingly, the software-defined adaptive filter may determine the optimal combination of primary beams 112 (FIG. 5A, 5B) required to maximize directionality, gain, and SNR of the adaptive beam pattern 114. In some embodiments, the software-defined adaptive filter is trained using the current interference profile as well as previously calculated interference profiles and adaptive beam patterns 114. Accordingly, the system 100 improves the SNR without the need for user-guided tuning. Further, the software-defined adaptive filter may identify hidden or foreign artifacts in the read beams or data signals exciting the transceiver nodes 104a-104n. Thus, the software-defined adaptive filter may increase the data security and fidelity of confidential transmissions. In some embodiments, the software-defined adaptive filter may be concurrently trained on the interference signal 702a-702n (see FIG. 7 described below) such that the software-defined adaptive filter continuously improves interference mitigation. In some embodiments, the machine learning algorithm monitors available system data to prevent adversaries from deciphering the beamforming algorithm, predicting adaptive beam patterns 114, or in any way attaining exploitable operational intelligence.

In some embodiments, the adaptive filter (FIG. 6) works in concert with the transceiver nodes 104a-104n to enable adaptive digital beamforming operations. Adaptive beamforming may describe the process of generating high gain and/or high-directionality beams while simultaneously generating null beams and/or spatial nulls 118 to mitigate the effects of external interference sources 110 (FIG. 5A) that may change over time. To facilitate this functionality, the adaptive filter may form a feedback loop with the transceiver nodes 104a-104n such that the efficacy of the adaptive beam pattern 114 in mitigating interference and generating beams is continuously monitored and the output for each transceiver node 104a-104n can be individually tuned to accommodate for changes in the configuration of the interference sources 110 and the target 120 (e.g., moving targets 120 and interference sources 110). In some embodiments, operation 616 may execute the following processes for obtaining SNR gain on targets: isolation of the target for a given AOA, (i.e., azimuth and elevation), sidelobe reduction of targets at other AOAs, and for adaptive beamforming, adaptive nulling of interference.

In some embodiments, the feedback loop of operation 616 (FIG. 6) is further refined in operation 618 where the central processing node may predict the AOA for any number of interference sources and then perform spatial aliasing to position the interference signal between a pair of sidelobes within the adaptive beam pattern. In some embodiments, the central processing node 206 may employ the plurality of transceiver nodes 104a-104n for interferometry operations to estimate a signal's AOA. The interferometry may include pairwise phase comparison to estimate both AOA and a spacing between array elements that is greater than lambda/2.

Figures 7A, 7B:
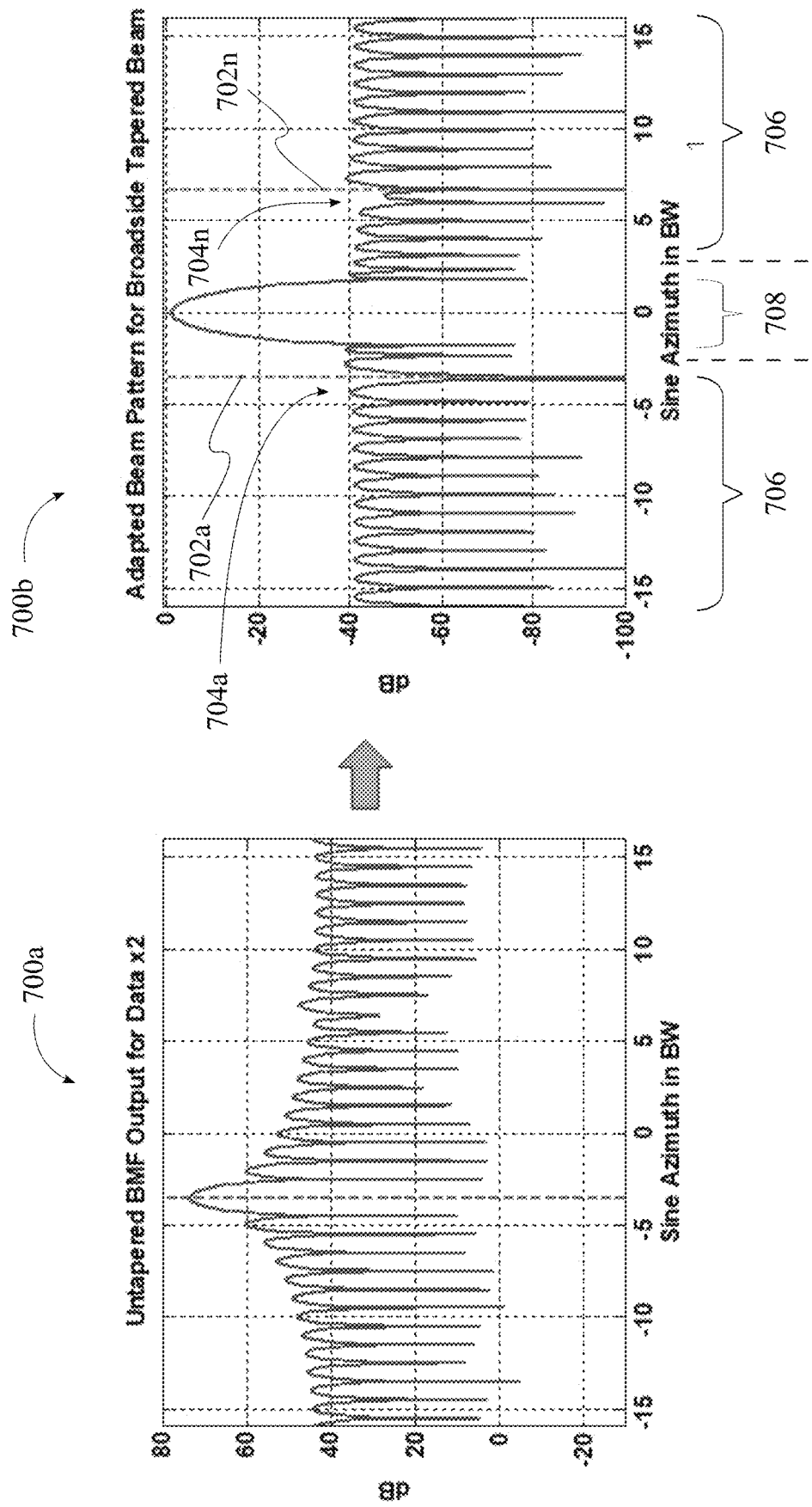
FIG. 7A shows a simulation of a typical antenna pattern, consistent with various embodiments.
FIG. 7B shows a demonstration of the system performing adaptive antenna nulling at spatial angles of interferers, consistent with various embodiments.

FIGS. 7A and 7B show how the system 100 can utilize adaptive beamforming techniques to create spatial nulls in the direction of interference sources 110 (FIG. 5A); thereby canceling their interference. In this case, two different sources of interference are canceled by adaptively beamforming to create two null beams in the direction of interference (FIG. 7B). FIG. 7A shows the output for a beamforming operation that does not apply sidelobe tuning or spatial nulling. Accordingly, the signal, or a first adaptive pattern 700a, has a relatively low level of directionality and relatively high sidelobe magnitude. FIG. 7B shows the output for a beamforming operation that applies sidelobe tuning and spatial nulling to generate a broadside tapered beam where a plurality of interference signals 702a-702n are positioned within spatial nulls 704 between the sidelobes 706. For example, a r second adaptive beam pattern 700b may simultaneously cancel the plurality of interference signals 702a-702n being generated by the plurality of interference sources 110 in a plurality of spatial directions (FIG. 5A and FIG. 7B). Further, the second adaptive beam pattern 700b may generate broadside tapered beam patterns capable of simultaneously nulling a plurality of spatially offset interference signals 702a-702n. Operations for generating the interference profile may further include determining, via the arbitrary processor 108a (FIG. 1A, FIG. 1B, FIG. 3B), an appropriate configuration of null beams 118 (FIG. 5A) to direct toward a corresponding interference source from a plurality of interference sources 110 (FIG. 5A) whenever any of the plurality of targets 120 (FIG. 5A, 5B) is within the area of interest 103 (FIG. 5A) or field of regard 501 (FIG. 5B). Further, the interference profile may be incorporated into the adaptive beam pattern 114 (FIG. 5A, 5B) such that outputting the adaptive beam pattern 114 includes adaptive beamforming techniques to point high-gain and/or high directionality beams 116 (FIG. 5A) toward the at least one target 120 while simultaneously creating null beams 118 to cancel the plurality of interference sources 110. In some embodiments, the at least one adaptive beam (pattern) 114 (e.g., second adaptive beam pattern 700b) includes a mainlobe 708 and a plurality of sidelobes 706, wherein a bandwidth of the mainlobe 708 decreases as a magnitude of a direction vector for the plurality of sidelobes 706 increases. Further, the sidelobes 706 may be suppressed up to 40 dB and the adaptive beam pattern 114 (e.g., second adaptive beam pattern 700b) may implement up to 70 dB of co-channel interference mitigation through spatial beam nulling. In some embodiments, the system 100 enables up to 2 Gbps communication links while mitigating interference up to 40 dB, via wideband true time achieving 200 MHz bandwidth up to QAM1024 constellations.

The central processing node may include a subprocess for updating the adaptive beam pattern 114 (FIG. 5A) in response to user commands or changes in the state of the at least one target 120 (FIG. 5A, FIG. 5B), the transceiver nodes 104a-104n (FIG. 5A, 5B), or the plurality of interference sources 110 (FIG. 5A). The update subprocess may begin after directing, via the arbitrary processor 108a (FIG. 1B), the plurality of transceiver nodes 104a-104n to output at least one first adaptive beam pattern 700a (FIG. 7B). The subprocess may continue by receiving, via the arbitrary processor 108a (e.g., plurality of processor nodes 108a-108n), an update request. For example, the update request may be a user supplied command that directs the system 100 (FIG. 1A, FIG. 1B) to acquire a new target 120 or to attenuate a newly discovered interference source 110. The subprocess may continue by directing, via the arbitrary processor 108a, the plurality of transceiver nodes 104a-104n to output at least one second adaptive beam pattern 700b in accordance with the update request FIG. 7B. FIG. 7A and FIG. 7B show the signal response as the second adaptive beam pattern 700b as the response to an update request directing the system 100 to begin spatial nulling of interference signals 702a-702n.

In some embodiments, the system 100 (FIG. 1A, FIG. 1B) may be configured to monitor the area of interest 103 (FIG. 5A) for changes in the plurality of interference sources 110. For example, the central processing node (e.g., 206 FIG. 2) may generate an alert when new interference sources are detected and may automatically update the interference profile to account for changes in the state of any identified interference sources 110 (e.g., modifications to frequency, position, directionality, signal strength). The subprocess may begin by identifying, via the processor 108, a change in the interference profile for the area of interest 103 and updating the interference mitigation protocol based on the identified change. The subprocess may continue by directing, via the processor (e.g., 206), the plurality of transceiver nodes 104a-104n to output at least one updated adaptive beam pattern 114 and the at least one mitigation signal (or null beam 118) as at least one spatial null coincident with the at least one interference source 110, in accordance with the updated interference mitigation protocol.

Figure 8:
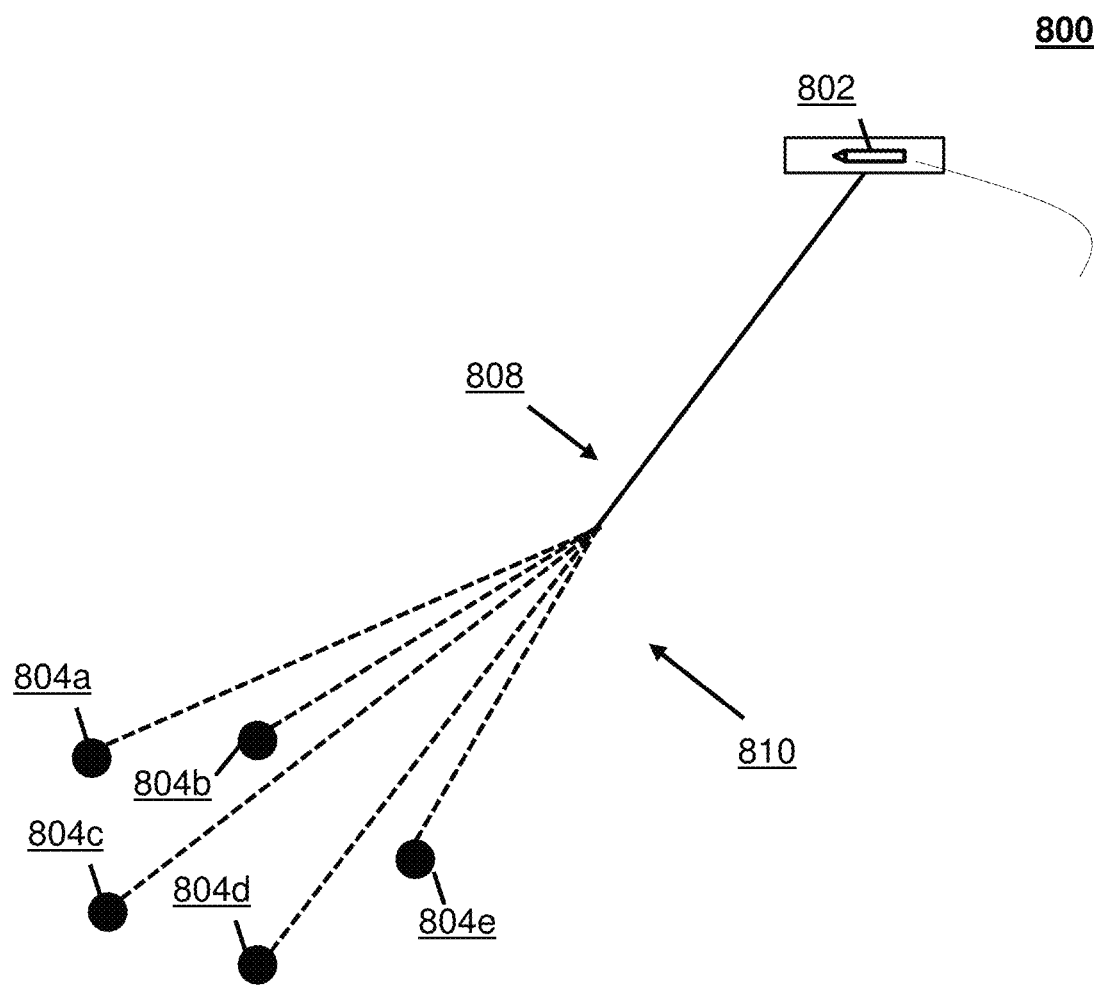
FIG. 8 is a block diagram of a radar system implemented using the system of FIG. 1A, consistent with various embodiments.

FIG. 8 is a block diagram of a single phased array-based radar system 800 implemented using the system 100 of FIG. 1A, consistent with various embodiments. The radar system 800 includes a number of subarrays (e.g., sensor nodes 804*a*, 804*b*, 804*c*, 804*d*, and 804*e*) that are configured to facilitate surveillance of a moving object (e.g., detection of an aircraft 802). In some embodiments, the sensor nodes 804*a*-804*e* are similar to the subarrays 102*a*-102*n* of the system 100. In some embodiments, one of the sensor nodes 804*a*-804*e* may be designated as a reference node and a central processing node. In some embodiments, all the sensor nodes 804*a*-804*e* are configured as transmit and receive sensor nodes. The sensor nodes 804*a*-804*e* may be time synchronized as described at least with reference to FIGS. 4 and 5A-5B above. Further, the time aligned signals may be cohered as described at least with reference to FIG. 6 above. The radar system 800 may be configured to work in a wide range of frequencies (e.g., 50 MHz to 36 GHz).

The sensor nodes 804*a*-804*e* are configured to transmit a probe signal 808 in a beamforming pattern. The signals reflected from the aircraft 802 may be received by the sensor nodes as data signals 810. The data signals 810 are time aligned, cohered, and processed to determine one or more parameters of the aircraft 802 (e.g., distance or speed of the aircraft).

While FIG. 8 shows a single cluster of sensor nodes 804*a*-804*e*, the radar system 800 may have several clusters. In some embodiments, each black dot in FIG. 8 may be a cluster of sensor nodes. For example, the black dot 804*a* can be a first cluster, the block dot 804*b* can be a second cluster and so on, each of which includes several sensor nodes. In some embodiments, such a configuration enables detection of a moving object at ultra-long range and hypersonic speeds. In some embodiments, the sensor nodes or clusters may be spread over a few hundred meters or distributed across a large geographic region.

The system 100 may also be implemented as a mobile sensor array system. For example, the subarray elements 104*a*-104*n* may be designed as mobile subarray elements that are battery powered, solar powered, etc. and may be installed in an automobile, an unmanned aerial vehicle (UAV), or other mobile devices.

While FIG. 8 describes implementation of the system 100 as a radar system, the system 100 may also be implemented as a sonar system to facilitate surveillance of objects moving underwater (e.g., a submarine). For example, the subarray elements 104*a*-104*n* may be configured as hydrophone subarray elements, which can be installed as buoys or as mobile hydrophones (e.g., in submarines). The hydrophone subarray elements 104*a*-104*n* may be associated with above water components that communicate with satellites and have GPS capability.

In yet another example, the system 100 may be implemented for oil and gas and mining industry to facilitate detection of oil (or any other energy) and metals. For example, the subarray elements 104*a*-104*n* may be configured to work with seismic or acoustic waveforms and the cohered signals may be used to detect oil (or any other energy) and metals.

In some embodiments, the various components or modules illustrated in the Figures or described in the foregoing paragraphs may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices. Cloud components may include control circuitry configured to perform the various operations needed to implement the disclosed embodiments. Cloud components may include cloud-based storage circuitry configured to electronically store information. Cloud components may also include cloud-based input/output circuitry configured to display information.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

It should be appreciated that the description of the functionality provided by the components or modules described herein is for illustrative purposes, and is not intended to be limiting, as any of the components or modules may provide more or less functionality than is described. For example, one or more of the components or modules may be eliminated, and some or all of its functionality may be provided by other ones of the components or modules. As another example, additional components or modules may be programmed to perform some or all of the functionality attributed herein to one of the components or modules.

The following list of clauses describes various aspects of the systems and methods described herein, which may be combined in any combination.

1: A method for scalable on array processing and interference mitigation using adaptive beamforming, may include: calibrating, via an arbitrary processor node, a plurality of aggregated weight vectors for a plurality of subarray elements within a phased array, where the arbitrary processor node is from a plurality of processor nodes; determining, via a corresponding processor node, if a covariance matrix is full rank in relation to each of the plurality of aggregated weight vectors, where each of the plurality of subarray elements is associated with the corresponding processor node from the plurality of processor nodes; generating, via the corresponding processor node, an interference mitigation protocol for each of the plurality of subarray elements based on at least one of the aggregated weight vector and the covariance matrix; and outputting, via the plurality of subarray elements, an adaptive beam pattern in accordance with the interference mitigation protocol, where the adaptive beam pattern includes a at least one high-directionality beam generated by at least one first subarray element and at least one mitigation signal modulated by at least one second subarray element.

2: The method as clause 1 describes, further may include: distributing, via at least one arbitrary processor, at least one steering vector routine to each of the plurality of subarrays, where status information is generated during the at least one steering vector routine; determining, via the arbitrary processor, an interference profile based on status information for the plurality of subarray elements, where the interference profile includes at least one interference source; and executing, via at least one arbitrary processor, an intermediary collation operation based on the status information and the interference profile, where the intermediary collation operation generates a plurality of subarray-dependent adaptive processes, and where a corresponding adaptive process from the plurality of subarray-dependent adaptive processes is associated with each of the plurality of subarray elements.

3: The method as either of clauses 1 or 2 describe, where the corresponding adaptive process is adapted in response to an output of each of the plurality of subarray elements, a desired steering vector, and the covariance matrix.

4: The method as any of clauses 1-3 describe, where the plurality of subarray elements is configured into a tiered operational structure, and where each of a plurality of representative weight vectors is associated with a corresponding subarray element from the plurality of subarray elements within an arbitrary tier of the tiered operational structure, and where the aggregated weight vector is based on a plurality of representative weight vectors, a rank of each representative weight vector, and a desired steering vector.

5: The method as any of clauses 1-4 describe, where the aggregated weight vector of the arbitrary tier is designated as a new representative weight vector in a subsequent tier of the tiered operational structure, and where an intermediary collation operation is repeated using all representative weight vectors in the subsequent tier.

6: The method as any of clauses 1-5 describe, where calibrating the aggregated weight vector for the subsequent tier includes relaying all aggregated weight vector data generated in the subsequent tier as status information for preceding tiers of the tiered operational structure.

7: The method as any of clauses 1-6 describe, where the phased array is disposed to assess an area of interest, and where each of the plurality of subarray elements is configured to attenuate at least one interference source within a field of regard, and where the field of regard is a portion of the area of interest.

8: The method as any of clauses 1-7 describe, where generating the interference mitigation protocol includes spatial aliasing techniques to attenuate at least one interference source.

9: The method as any of clauses 1-8 describe, where a covariance matrix model based on the interference mitigation protocol includes both steady-state interference and transient noise.

10: The method as any of clauses 1-9 describe, where generating the interference mitigation protocol includes improving beam directionality and spatial nulling by performing statistical analytical techniques including maximum-likelihood estimation and nonlinear least square estimation.

11: A system for scalable on array processing and interference mitigation using adaptive beamforming may include: one or more processors configured to: calibrate, via an arbitrary processor node, a plurality of aggregated weight vectors for a plurality of subarray elements within a phased array, where the arbitrary processor node is from a plurality of processor nodes; determine, via a corresponding processor node, if a covariance matrix is full rank in relation to each of the plurality of aggregated weight vectors, where each of the plurality of subarray elements is associated with the corresponding processor node from the plurality of processor nodes; generate, via the corresponding processor node, an interference mitigation protocol for each of the plurality of subarray elements based on at least one of the aggregated weight vector and the covariance matrix; and output, via the plurality of subarray elements, an adaptive beam pattern in accordance with the interference mitigation protocol, where the adaptive beam pattern includes a at least one high-directionality beam generated by at least one first subarray element and at least one mitigation signal modulated by at least one second subarray element.

12: The system as clause 11 describes, where the one or more processors are further configured to: distribute, via at least one arbitrary processor, at least one steering vector routine to each of the plurality of subarrays, where status information is generated during the at least one steering vector routine; determine, via the arbitrary processor, an interference profile based on status information for the plurality of subarray elements, where the interference profile includes at least one interference source; and execute, via at least one arbitrary processor, an intermediary collation operation based on the status information and the interference profile, where the intermediary collation operation generates a plurality of subarray-dependent adaptive processes, and where a corresponding adaptive process from the plurality of subarray-dependent adaptive processes is associated with each of the plurality of subarray elements.

13: The system as either of clauses 11 or 12 describe, where the corresponding adaptive process is adapted in response to an output of each of the plurality of subarray elements, a desired steering vector, and the covariance matrix.

14: The system as any of clauses 11-13 describe, where the plurality of subarray elements is configured into a tiered operational structure, and each of a plurality of representative weight vectors is associated with a corresponding subarray element from the plurality of subarray elements within an arbitrary tier of the tiered operational structure, and the aggregated weight vector is based on a plurality of representative weight vectors, a rank of each representative weight vector, and a desired steering vector.

15: The system as any of clauses 11-14 describe, where the aggregated weight vector of the arbitrary tier is designated as a new representative weight vector in a subsequent tier of the tiered operational structure, and an intermediary collation operation is repeated using all representative weight vectors in the subsequent tier.

16: The system as any of clauses 11-15 describe, where calibrating the aggregated weight vector for the subsequent tier includes relaying all aggregated weight vector data generated in the subsequent tier as status information for preceding tiers of the tiered operational structure.

17: The system as any of clauses 11-16 describe, where the phased array is disposed to assess an area of interest, and each of the plurality of subarray elements is configured to attenuate at least one interference source within a field of regard, and the field of regard is a portion of the area of interest.

18: The system as any of clauses 11-17 describe, where generating the interference mitigation protocol includes spatial aliasing techniques to attenuate at least one interference source.

19: The system as any of clauses 11-18 describe, where a covariance matrix model based on the interference mitigation protocol includes both steady-state interference and transient noise.

20: The system as any of clauses 11-19 describe, where generating the interference mitigation protocol includes improving beam directionality and spatial nulling by performing statistical analytical techniques including maximum-likelihood estimation and nonlinear least square estimation.

21: A non-transitory computer-readable medium storing a set of instructions for scalable on array processing and interference mitigation using adaptive beamforming, the set of instructions may include: one or more instructions that, when executed by one or more processors of a device, cause the device to: calibrate, via an arbitrary processor node, a plurality of aggregated weight vectors for a plurality of subarray elements within a phased array, where the arbitrary processor node is from a plurality of processor nodes; determine, via a corresponding processor node, if a covariance matrix is full rank in relation to each of the plurality of aggregated weight vectors, where each of the plurality of subarray elements is associated with the corresponding processor node from the plurality of processor nodes; generate, via the corresponding processor node, an interference mitigation protocol for each of the plurality of subarray elements based on at least one of the aggregated weight vector and the covariance matrix; and output, via the plurality of subarray elements, an adaptive beam pattern in accordance with the interference mitigation protocol, where the adaptive beam pattern includes a at least one high-directionality beam generated by at least one first subarray element and at least one mitigation signal modulated by at least one second subarray element.

22: The non-transitory computer-readable medium as clause 21 describes, where the one or more instructions further cause the device to: distribute, via at least one arbitrary processor, at least one steering vector routine to each of the plurality of subarrays, where status information is generated during the at least one steering vector routine; determine, via the arbitrary processor, an interference profile based on status information for the plurality of subarray elements, where the interference profile includes at least one interference source; and execute, via at least one arbitrary processor, an intermediary collation operation based on the status information and the interference profile, where the intermediary collation operation generates a plurality of subarray-dependent adaptive processes, and where a corresponding adaptive process from the plurality of subarray-dependent adaptive processes is associated with each of the plurality of subarray elements.

23: The non-transitory computer-readable medium as either of clauses 21 or 22 describe, where the corresponding adaptive process is adapted in response to an output of each of the plurality of subarray elements, a desired steering vector, and the covariance matrix.

24: The non-transitory computer-readable medium as any of clauses 21-23 describe, where the plurality of subarray elements is configured into a tiered operational structure, and each of a plurality of representative weight vectors is associated with a corresponding subarray element from the plurality of subarray elements within an arbitrary tier of the tiered operational structure, and the aggregated weight vector is based on a plurality of representative weight vectors, a rank of each representative weight vector, and a desired steering vector.

25: The non-transitory computer-readable medium as any of clauses 21-24 describe, where the aggregated weight vector of the arbitrary tier is designated as a new representative weight vector in a subsequent tier of the tiered operational structure, and an intermediary collation operation is repeated using all representative weight vectors in the subsequent tier.

26: The non-transitory computer-readable medium as any of clauses 21-25 describe, where calibrating the aggregated weight vector for the subsequent tier includes relaying all aggregated weight vector data generated in the subsequent tier as status information for preceding tiers of the tiered operational structure.

27: The non-transitory computer-readable medium as any of clauses 21-26 describe, where the phased array is disposed to assess an area of interest, and each of the plurality of subarray elements is configured to attenuate at least one interference source within a field of regard, and the field of regard is a portion of the area of interest.

28: The non-transitory computer-readable medium as any of clauses 21-27 describe, where generating the interference mitigation protocol includes spatial aliasing techniques to attenuate at least one interference source.

29: The non-transitory computer-readable medium as any of clauses 21-28 describe, where a covariance matrix model based on the interference mitigation protocol includes both steady-state interference and transient noise.

30: The non-transitory computer-readable medium as any of clauses 21-29 describe, where generating the interference mitigation protocol includes improving beam directionality and spatial nulling by performing statistical analytical techniques including maximum-likelihood estimation and nonlinear least square estimation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A method for scalable on-array processing and interference mitigation using adaptive beamforming, comprising:
    calibrating, via an arbitrary processor node, a plurality of aggregated weight vectors for a plurality of subarray elements within a phased array, wherein the arbitrary processor node is from a plurality of processor nodes;
    determining, via a corresponding processor node, if a covariance matrix is full rank in relation to each of the plurality of aggregated weight vectors, wherein each of the plurality of subarray elements is associated with the corresponding processor node from the plurality of processor nodes;
    generating, via the corresponding processor node, an interference mitigation protocol for each of the plurality of subarray elements based on at least one of the aggregated weight vector and the covariance matrix; and
    outputting, via the plurality of subarray elements, an adaptive beam pattern in accordance with the interference mitigation protocol, wherein the adaptive beam pattern includes a at least one high-directionality beam generated by at least one first subarray element and at least one mitigation signal modulated by at least one second subarray element.

2. The method of claim 1, further comprising:
    distributing, via at least one arbitrary processor, at least one steering vector routine to each of the plurality of subarrays, wherein status information is generated during the at least one steering vector routine;
    determining, via the arbitrary processor, an interference profile based on status information for the plurality of subarray elements, wherein the interference profile includes at least one interference source; and
    executing, via at least one arbitrary processor, an intermediary collation operation based on the status information and the interference profile, wherein the intermediary collation operation generates a plurality of subarray-dependent adaptive processes, and wherein a corresponding adaptive process from the plurality of subarray-dependent adaptive processes is associated with each of the plurality of subarray elements.

3. The method of claim 2, wherein the corresponding adaptive process is adapted in response to an output of each of the plurality of subarray elements, a desired steering vector, and the covariance matrix.

4. The method of claim 1, wherein the plurality of subarray elements is configured into a tiered operational structure, and wherein each of a plurality of representative weight vectors is associated with a corresponding subarray element from the plurality of subarray elements within an arbitrary tier of the tiered operational structure, and wherein the aggregated weight vector is based on a plurality of representative weight vectors, a rank of each representative weight vector, and a desired steering vector.

5. The method of claim 4, wherein the aggregated weight vector of the arbitrary tier is designated as a new representative weight vector in a subsequent tier of the tiered operational structure, and wherein an intermediary collation operation is repeated using all representative weight vectors in the subsequent tier.

6. The method of claim 5, wherein calibrating the aggregated weight vector for the subsequent tier includes relaying all aggregated weight vector data generated in the subsequent tier as status information for preceding tiers of the tiered operational structure.

7. The method of claim 1, wherein the phased array is disposed to assess an area of interest, and wherein each of the plurality of subarray elements is configured to attenuate at least one interference source within a field of regard, and wherein the field of regard is a portion of the area of interest.

8. The method of claim 1, wherein generating the interference mitigation protocol includes spatial aliasing techniques to attenuate at least one interference source.

9. The method of claim 1, wherein a covariance matrix model based on the interference mitigation protocol includes both steady-state interference and transient noise.

10. The method of claim 1, wherein generating the interference mitigation protocol includes improving beam directionality and spatial nulling by performing statistical analytical techniques including maximum-likelihood estimation and nonlinear least square estimation.

11. A system for scalable on array processing and interference mitigation using adaptive beamforming comprising:
    one or more processors configured to:
    calibrate, via an arbitrary processor node, a plurality of aggregated weight vectors for a plurality of subarray elements within a phased array, wherein the arbitrary processor node is from a plurality of processor nodes;
    determine, via a corresponding processor node, if a covariance matrix is full rank in relation to each of the plurality of aggregated weight vectors, wherein each of the plurality of subarray elements is associated with the corresponding processor node from the plurality of processor nodes;
    generate, via the corresponding processor node, an interference mitigation protocol for each of the plurality of subarray elements based on at least one of the aggregated weight vector and the covariance matrix; and
    output, via the plurality of subarray elements, an adaptive beam pattern in accordance with the interference mitigation protocol, wherein the adaptive beam pattern includes a at least one high-directionality beam generated by at least one first subarray element and at least one mitigation signal modulated by at least one second subarray element.

12. The system of claim 11, wherein the one or more processors are further configured to:
    distribute, via at least one arbitrary processor, at least one steering vector routine to each of the plurality of subarrays, wherein status information is generated during the at least one steering vector routine;
    determine, via the arbitrary processor, an interference profile based on status information for the plurality of subarray elements, wherein the interference profile includes at least one interference source; and execute, via at least one arbitrary processor, an intermediary collation operation based on the status information and the interference profile, wherein the intermediary collation operation generates a plurality of subarray-dependent adaptive processes, and wherein a corresponding adaptive process from the plurality of subarray-dependent adaptive processes is associated with each of the plurality of subarray elements.

13. The system of claim 12, wherein the corresponding adaptive process is adapted in response to an output of each of the plurality of subarray elements, a desired steering vector, and the covariance matrix.

14. The system of claim 11, wherein the plurality of subarray elements is configured into a tiered operational structure, and each of a plurality of representative weight vectors is associated with a corresponding subarray element from the plurality of subarray elements within an arbitrary tier of the tiered operational structure, and the aggregated weight vector is based on a plurality of representative weight vectors, a rank of each representative weight vector, and a desired steering vector.

15. The system of claim 14, wherein the aggregated weight vector of the arbitrary tier is designated as a new representative weight vector in a subsequent tier of the tiered operational structure, and an intermediary collation operation is repeated using all representative weight vectors in the subsequent tier.

16. The system of claim 15, wherein calibrating the aggregated weight vector for the subsequent tier includes relaying all aggregated weight vector data generated in the subsequent tier as status information for preceding tiers of the tiered operational structure.

17. The system of claim 11, wherein the phased array is disposed to assess an area of interest, and each of the plurality of subarray elements is configured to attenuate at least one interference source within a field of regard, and the field of regard is a portion of the area of interest.

18. The system of claim 11, wherein generating the interference mitigation protocol includes spatial aliasing techniques to attenuate at least one interference source.

19. The system of claim 11, wherein a covariance matrix model based on the interference mitigation protocol includes both steady-state interference and transient noise.

20. The system of claim 11, wherein generating the interference mitigation protocol includes improving beam directionality and spatial nulling by performing statistical analytical techniques including maximum-likelihood estimation and nonlinear least square estimation.

21. A non-transitory computer-readable medium storing a set of instructions for scalable on array processing and interference mitigation using adaptive beamforming, the set of instructions comprising:

one or more instructions that, when executed by one or more processors of a device, cause the device to:

calibrate, via an arbitrary processor node, a plurality of aggregated weight vectors for a plurality of subarray elements within a phased array, wherein the arbitrary processor node is from a plurality of processor nodes;

determine, via a corresponding processor node, if a covariance matrix is full rank in relation to each of the plurality of aggregated weight vectors, wherein each of the plurality of subarray elements is associated with the corresponding processor node from the plurality of processor nodes;

generate, via the corresponding processor node, an interference mitigation protocol for each of the plurality of subarray elements based on at least one of the aggregated weight vector and the covariance matrix; and output, via the plurality of subarray elements, an adaptive beam pattern in accordance with the interference mitigation protocol, wherein the adaptive beam pattern includes a at least one high-directionality beam generated by at least one first subarray element and at least one mitigation signal modulated by at least one second subarray element.

22. The non-transitory computer-readable medium of claim 21, wherein the one or more instructions further cause the device to:

distribute, via at least one arbitrary processor, at least one steering vector routine to each of the plurality of subarrays, wherein status information is generated during the at least one steering vector routine;

determine, via the arbitrary processor, an interference profile based on status information for the plurality of subarray elements, wherein the interference profile includes at least one interference source; and execute, via at least one arbitrary processor, an intermediary collation operation based on the status information and the interference profile, wherein the intermediary collation operation generates a plurality of subarray-dependent adaptive processes, and wherein a corresponding adaptive process from the plurality of subarray-dependent adaptive processes is associated with each of the plurality of subarray elements.

23. The non-transitory computer-readable medium of claim 22, wherein the corresponding adaptive process is adapted in response to an output of each of the plurality of subarray elements, a desired steering vector, and the covariance matrix.

24. The non-transitory computer-readable medium of claim 21, wherein the plurality of subarray elements is configured into a tiered operational structure, and each of a plurality of representative weight vectors is associated with a corresponding subarray element from the plurality of subarray elements within an arbitrary tier of the tiered operational structure, and the aggregated weight vector is based on a plurality of representative weight vectors, a rank of each representative weight vector, and a desired steering vector.

25. The non-transitory computer-readable medium of claim 24, wherein the aggregated weight vector of the arbitrary tier is designated as a new representative weight vector in a subsequent tier of the tiered operational structure, and an intermediary collation operation is repeated using all representative weight vectors in the subsequent tier.

26. The non-transitory computer-readable medium of claim 25, wherein calibrating the aggregated weight vector for the subsequent tier includes relaying all aggregated weight vector data generated in the subsequent tier as status information for preceding tiers of the tiered operational structure.

27. The non-transitory computer-readable medium of claim 21, wherein the phased array is disposed to assess an area of interest, and each of the plurality of subarray elements is configured to attenuate at least one interference source within a field of regard, and the field of regard is a portion of the area of interest.

28. The non-transitory computer-readable medium of claim 21, wherein generating the interference mitigation protocol includes spatial aliasing techniques to attenuate at least one interference source.

29. The non-transitory computer-readable medium of claim 21, wherein a covariance matrix model based on the interference mitigation protocol includes both steady-state interference and transient noise.

30. The non-transitory computer-readable medium of claim 21, wherein generating the interference mitigation protocol includes improving beam directionality and spatial nulling by performing statistical analytical techniques including maximum-likelihood estimation and nonlinear least square estimation.

* * * * *